US012589775B2

(12) United States Patent
Jeong et al.

(10) Patent No.: US 12,589,775 B2
(45) Date of Patent: Mar. 31, 2026

(54) METHOD AND DEVICE WITH AUTONOMOUS DRIVING PLAN OFFSET ADJUSTMENT

(71) Applicant: SAMSUNG ELECTRONICS CO., LTD., Suwon-si (KR)

(72) Inventors: Jaemuk Jeong, Suwon-si (KR); Jahoo Koo, Suwon-si (KR); Seho Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 18/321,987

(22) Filed: May 23, 2023

(65) Prior Publication Data

US 2024/0149921 A1 May 9, 2024

(30) Foreign Application Priority Data

Nov. 9, 2022 (KR) ........................ 10-2022-0148579

(51) Int. Cl.
*B60W 60/00* (2020.01)
*B60W 10/20* (2006.01)
*B60W 30/14* (2006.01)
*B60W 50/00* (2006.01)

(52) U.S. Cl.
CPC ...... *B60W 60/00274* (2020.02); *B60W 10/20* (2013.01); *B60W 30/143* (2013.01); *B60W 50/0097* (2013.01)

(58) Field of Classification Search
CPC ........... B60W 60/00274; B60W 10/20; B60W 30/143; B60W 50/0097
See application file for complete search history.

(56) References Cited

U.S. PATENT DOCUMENTS

| | | | |
|---|---|---|---|
| 8,589,014 B2 | 11/2013 | Fairfield et al. | |
| 11,231,286 B2 | 1/2022 | Stentz et al. | |
| 2009/0048768 A1 | 2/2009 | Taguchi | |
| 2017/0082454 A1 * | 3/2017 | Jurk | G01C 21/20 |
| 2020/0094839 A1 * | 3/2020 | Clarke | B60W 30/143 |
| 2020/0114898 A1 | 4/2020 | Sutorius et al. | |

(Continued)

FOREIGN PATENT DOCUMENTS

| | | |
|---|---|---|
| DE | 10 2015 205 930 A1 | 10/2016 |
| DE | 10 2018 217 746 A1 | 4/2020 |

(Continued)

OTHER PUBLICATIONS

Extended European search report issued on Apr. 22, 2024, in counterpart European Patent Application No. 23178218.6 (8 pages).

*Primary Examiner* — Scott A Browne
*Assistant Examiner* — Terry C Buse
(74) *Attorney, Agent, or Firm* — NSIP Law

(57) ABSTRACT

An electronic device and method for more accurate autonomous driving, where the electronic device includes a sensor disposed in a moving object and configured to generate sensing data, and a processor configured to determine a predicted position of the moving object and a region of interest (ROI) based on a driving plan of the moving object, select a target position offset based on an available sensing region of the sensor in the ROI and the predicted position, and update the driving plan of the moving object based on the target position offset.

22 Claims, 18 Drawing Sheets

(56)     References Cited

U.S. PATENT DOCUMENTS

| | | | |
|---|---|---|---|
| 2020/0133282 A1 | 4/2020 | Choi et al. | |
| 2020/0189583 A1* | 6/2020 | Tatourian | G06F 16/29 |
| 2020/0379465 A1* | 12/2020 | Adam | B60W 30/095 |
| 2021/0027077 A1* | 1/2021 | Hayashi | G06V 10/98 |
| 2021/0109523 A1 | 4/2021 | Zou et al. | |
| 2021/0343022 A1* | 11/2021 | Cohen | G01S 13/931 |
| 2022/0169176 A1* | 6/2022 | Coudre | B60K 35/22 |
| 2023/0406301 A1* | 12/2023 | Parks | B60W 30/12 |
| 2024/0087302 A1* | 3/2024 | Temple | G06V 10/25 |
| 2024/0094351 A1* | 3/2024 | Li | G01S 7/4813 |

FOREIGN PATENT DOCUMENTS

| | | |
|---|---|---|
| EP | 4 059 795 A1 | 9/2022 |
| JP | 4396743 B2 | 1/2010 |
| KR | 10-2020-0003355 A | 1/2020 |
| KR | 10-2295578 B1 | 8/2021 |
| KR | 10-2348294 B1 | 1/2022 |
| KR | 10-2022-0058937 A | 5/2022 |
| KR | 10-2022-0072101 A | 6/2022 |

* cited by examiner

From 210

From 230

METHOD AND DEVICE WITH AUTONOMOUS DRIVING PLAN OFFSET ADJUSTMENT

CROSS-REFERENCE TO RELATED APPLICATIONS

This application claims the benefit under 35 USC § 119(a) of Korean Patent Application No. 10-2022-0148579, filed on Nov. 9, 2022, in the Korean Intellectual Property Office, the entire disclosure of which is incorporated herein by reference for all purposes.

BACKGROUND

1. Field

The following description relates to an autonomous driving plan.

2. Description of Related Art

An autonomous system or advanced driver assistance system (ADAS) recognizes a driving situation to a designated destination without the intervention of driver (or passenger) and enables automatic driving. Autonomous vehicles have the increasing attention as a means of transportation in the future, and thus, there has been a growing interest therein.

An autonomous vehicle may carry out the operations of recognition, determination, path generation, and vehicle control. For example, an autonomous vehicle may determine a surrounding situation based on sensing data that is collected in a recognition operation and may generate a driving path for the autonomous vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an electronic device including a sensor disposed in a moving object and configured to generate sensing data, and a processor configured to determine a predicted position of the moving object and a region of interest (ROI) based on a driving plan of the moving object, select a target position offset based on an available sensing region of the sensor in the ROI and the predicted position, and update the driving plan of the moving object based on the target position offset.

The processor may be configured to predict a position of the moving object at a prediction time point based on a path of the moving object, a velocity of the moving object, and the driving plan of the moving object.

The processor may be configured to determine the ROI based on at least one of a driving lane of the moving object or a scheduled driving lane of the moving object based on the driving plan.

The processor may be configured to determine the ROI based on an alignment of a road and a width of a lane corresponding to the driving plan.

The processor may be configured to determine the ROI including a point corresponding to a height of an object spaced apart from the ground, in response to the moving object approaching the object, wherein the object is configured to provide traffic information.

The available sensing region of the sensor may be a region that is not occluded by an obstacle in an overlapping region of the ROI and a sensing range of the sensor.

The processor may be configured to select the target position offset in an adjustable driving range based on the predicted position of the moving object.

The processor may be configured to determine the adjustable driving range based on a driving lane of the moving object.

The adjustable driving range may correspond to a range that limits escape of the moving object from the driving lane.

The processor may be configured to select the target position offset based on a sensor range evaluation of a plurality of position offsets in the adjustable driving range.

A plurality of position offsets in the adjustable driving range may include an offset spaced apart from the sensor in a front direction of the moving object, an offset spaced apart from the sensor in a rear direction of the moving object, an offset spaced apart from the sensor in a first side direction of the moving object, and an offset spaced apart from the sensor in a second side direction of the moving object that may be opposite to the first side direction, wherein the processor may be configured to select the target position offset from the plurality of position offsets based on the predicted position of the moving object.

The ROI may include a plurality of points including a first point closer to the sensor and a second point farther from the sensor, wherein the processor may be configured to assign scores to the plurality of points, the assigned scores for the first point and the second point being different, calculate an evaluation score for each of the plurality of position offsets based on the scores assigned to the plurality of points, and select the target position offset from the plurality of position offsets based on the evaluation score.

The processor may be configured to generate an active sensing layer indicating a position corresponding to the target position offset, and determine the driving plan based on the active sensing layer and other layers for driving.

The processor may be configured to initiate a search for a position offset to increase the available sensing region of the sensor, in response to a ratio of an unavailable sensing region to a full sensing region of the sensor exceeding a threshold.

The processor may be configured to maintain the updated driving plan, in response to the ratio being lesser than or equal to the threshold.

The moving object corresponds to a vehicle, and the processor may be configured to control at least one of a velocity, an acceleration, and steering of the vehicle based on the updated driving plan.

The processor may be configured to move the moving object at a position in a driving lane to add the available sensing region of the sensor before the moving object changes a lane, in response to the driving plan comprises a lane change, and update the driving plan based on information sensed in the added available sensing region.

The driving plan may include a path heading to at least one of a travel destination or an intermediate destination based on a driving maneuver.

In another general aspect, there is provided a method implemented by a processor including determining a predicted position of a moving object and a region of interest (ROI) based on a driving plan of the moving object, selecting a target position offset based on an available sensing region of a sensor in the ROI and the predicted position, and updating the driving plan of the moving object based on the target position offset.

The wherein the target position offset comprises any one of a first offset distance from the sensor in a front of the moving object, a second offset distance from the sensor in a rear of the moving object, a third offset distance from the sensor in a first side of the moving object, or a fourth offset distance from the sensor in a second side of the moving object.

Other features and aspects will be apparent from the following detailed description, the drawings, and the claims.

Figure 1:
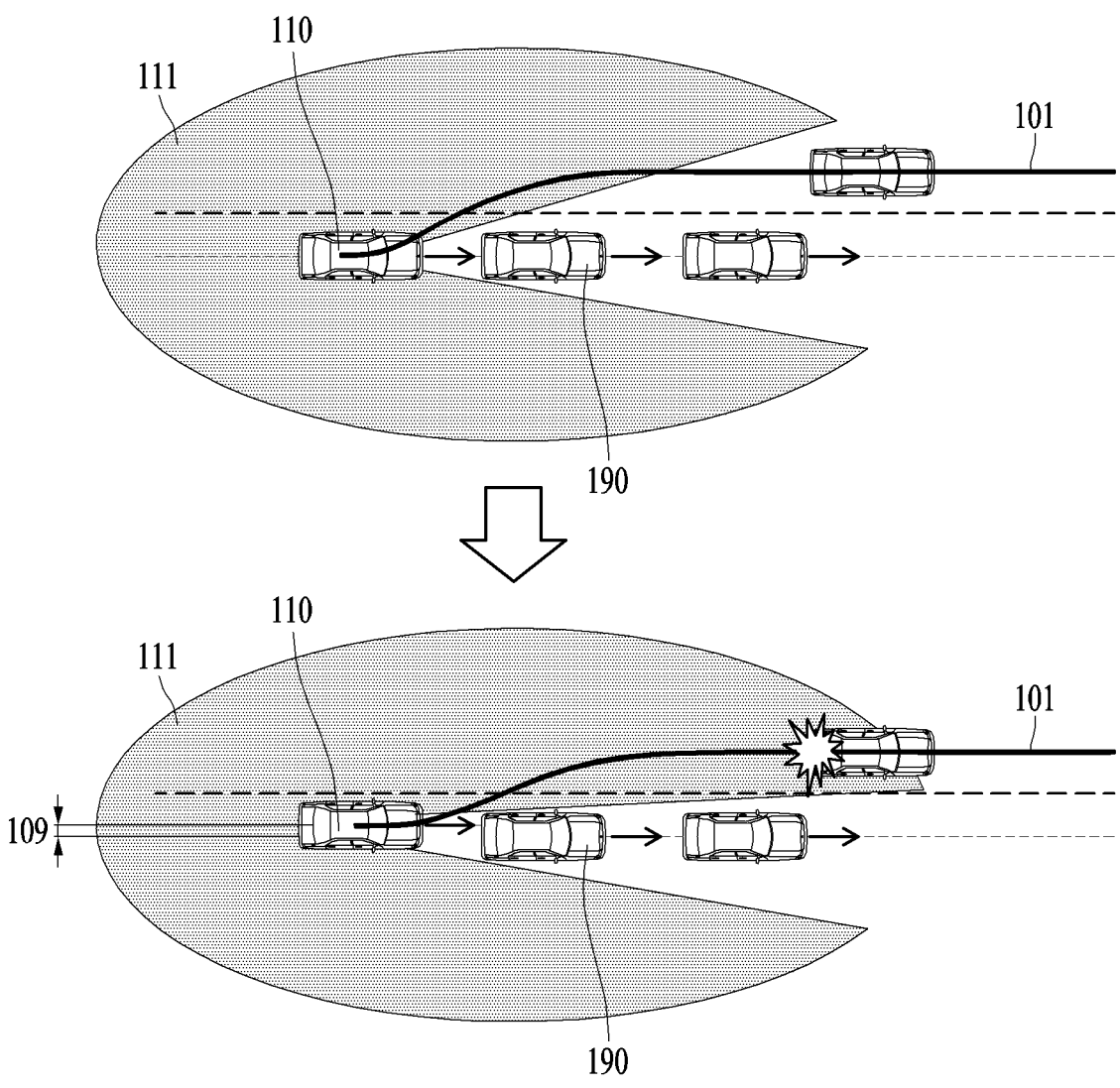
FIG. 1 illustrates an example of autonomous driving to secure a field of view (FOV) of a sensor.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third", or A, B, (a), (b), and the like may be used herein to describe various members, components, regions, layers, portions, or sections, these members, components, regions, layers, portions, or sections are not to be limited by these terms. Each of these terminologies is not used to define an essence, order, or sequence of corresponding members, components, regions, layers, portions, or sections, for example, but used merely to distinguish the corresponding members, components, regions, layers, portions, or sections from other members, components, regions, layers, portions, or sections. Thus, a first member, component, region, layer, portions, or section referred to in the examples described herein may also be referred to as a second member, component, region, layer, portions, or section without departing from the teachings of the examples.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. As used herein, the term "and/or" includes any and all combinations of one or more of the associated listed items. For example, "A and/or B" may be interpreted as "A," "B," or "A and B."

The terminology used herein is for the purpose of describing particular examples only and is not to be limiting of the examples. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of autonomous driving to secure a field of view (FOV) of a sensor.

In some examples, an electronic device may recognize a surrounding situation of a moving object 110 through a sensor. The electronic device may establish a driving plan 101 of the moving object 110 based on the recognized surrounding situation. The moving object 110 may be, for example, a vehicle. A vehicle equipped with an electronic device for establishing the driving plan 101 may be referred to as an autonomous vehicle. Herein, a vehicle is mainly described as an example of the moving object 110. However, the example is not limited thereto, and the moving object 110 may be an aircraft or a watercraft. Hereinafter, a vehicle refers to any mode of transportation, delivery, or communication such as, for example, for example, an automobile, a truck, a tractor, a scooter, a motorcycle, a cycle, an amphibious vehicle, a snowmobile, a boat, a public transit vehicle, a bus, a monorail, a train, a tram, an autonomous vehicle, an unmanned aerial vehicle, a bicycle, a walking assist device (WAD), a robot, a drone, and a flying object such as an airplane. In some examples, the vehicle may be, for example, an autonomous vehicle, a smart mobility, an electric vehicle, an intelligent vehicle, an electric vehicle (EV), a plug-in hybrid EV (PHEV), a hybrid EV (HEV), or a hybrid vehicle, an intelligent vehicle equipped with an advanced driver assistance system (ADAS) and/or an autonomous driving (AD) system.

In some examples, the autonomous vehicle is a self-driving vehicle that is equipped with one or more sensors, cameras, radio detection and ranging (RADAR), light detection and ranging (LiDAR) sensor, an infrared sensor, and an ultrasonic sensor, and/or other data-capturing devices that collect information about the surrounding environment. The autonomous vehicle may be controlled by an onboard computer system that uses algorithms, machine learning, and other artificial intelligence techniques to interpret the sensor data and to make decisions based on that information. The computer system can control the vehicle's speed, direction, acceleration, and braking, as well as other systems such as lighting, heating, and air conditioning. In some examples, the autonomous vehicle may be equipped with communication technologies to interact with other vehicles, infrastructure, and/or a central control system(s). The autonomous vehicle may operate in various modes, such as, for example, fully autonomous, semi-autonomous, and remote control where it is controlled by the central control system(s).

A sensor may be disposed in the moving object 110. The sensor may collect information related to autonomous or assisted driving of the moving object 110. For example, the sensor(s) in the moving object 110 may be arranged in one or more of a front surface, a rear surface, a side surface, a top surface, and a bottom surface of the moving object 110. Herein, for ease of description, a sensor is arranged in the top surface of the moving object 110 and has a sensing direction toward the front surface of the moving object 110. However, the arrangement of sensor and the sensing direction thereof are not limited thereto and may vary depending on design, without deviation from the spirit and scope of the illustrative examples described.

The sensing range (e.g., an FOV) of the sensor mounted on the autonomous vehicle may be limited by various surrounding environments. The FOV of the sensor may be, for example, an observable area through the sensor and may represent a maximum area that may be captured by the sensor. The FOV of the sensor may be referred to as a full sensing region. For example, as illustrated in FIG. 1, the FOV of the sensor may be occluded by another obstacle object 190. The obstacle object 190 may represent an object interrupting the FOV of the sensor. Herein, the description is provided with an example that the obstacle object 190 is another vehicle driving on the same road as the moving object 110 and in an example is a large cargo truck. However, the example is not limited thereto. The obstacle object 190 may include a road construction (e.g., an overpass and a tunnel) or a person (e.g., a pedestrian), or another type of vehicle. When the FOV of the sensor is limited by the obstacle object 190, collection of information on the surrounding situation of the moving object 110 may be limited. When collection of the information is limited, the electronic device may not determine a risk level of an invisible region of the sensor.

Herein, the road may be a roadway on which a vehicle drives and may include one or more lanes. The lane may be divided by a lane boundary. The lane boundary may be a line that defines a lane, may be a painted solid line or a dashed line on the road surface, and may be a curb arranged along the edge of the road.

The electronic device in an example may determine a need for securing the FOV of the sensor. The electronic device may generate a driving plan 101 (e.g., an active sensing trajectory) for securing an optimal FOV of the sensor. As the moving object 110 equipped with the electronic device (e.g., an autonomous vehicle) drives along the trajectory generated by the driving plan 101, the electronic device may recognize surrounding environment information. For example, referring to FIG. 1, the electronic device may search for a position to increase an available sensing region 111 of the sensor. The available sensing region 111 at an arbitrary position of the moving object 110 may represent a region excluding (or avoiding) an occluded region by the obstacle object 190 from a full sensing region. In other words, the available sensing region 111 may represent a region of the full sensing region that is not (or is less) occluded by the obstacle object 190. For example, the full sensing region may be a region based on an angle of FOV of the sensor and a maximum sensing distance. The available sensing region 111 may be a region based on the maximum sensing distance in the angle of field or a distance to the obstacle object 190. For reference, a sensing region occluded by the obstacle object 190 may be invisible to the sensor and may be referred to as an unavailable sensing region. A signal from a region beyond the obstacle object 190 may not reach the sensor of the vehicle 110 due to line of travel of the signal being interrupted. Further description of the available sensing region 111 of the sensor is provided below with reference to FIG. 3.

The electronic device may determine the driving plan 101 to be such that the vehicle 110 will pass through a position that increases the available sensing region 111 or an adjacent position. The electronic device may increase the available sensing region 111 of the sensor attached to the moving object 110 by causing the moving object 110 to move toward the position found in the driving lane. In FIG. 1, in some examples, the electronic device may execute the driving plan 101 for causing the moving object 110 to move by a position offset 109 in a lateral direction in the driving lane. In some examples, the electronic device may update the driving plan 101 using sensing data based on the added sensing region 111 that is available at the revised position after the moving object 110 is moved by the position offset 109. The added available sensing region 111 may include a new obstacle object that was not visible in the previous available sensing region 111. Accordingly, the electronic device may not attempt a driving plan 101 for overtaking a preceding vehicle and may execute a driving plan for maintaining the current driving lane.

The electronic device may use recognized surrounding environment information for various autonomous driving plans 101. The electronic device may determine a position (e.g., an active sensing position) in which the active FOV of the sensor may increase to avoid a situation in which the FOV of the sensor is limited. The electronic device may efficiently determine the driving plan 101 based on the active sensing position.

Figure 2:
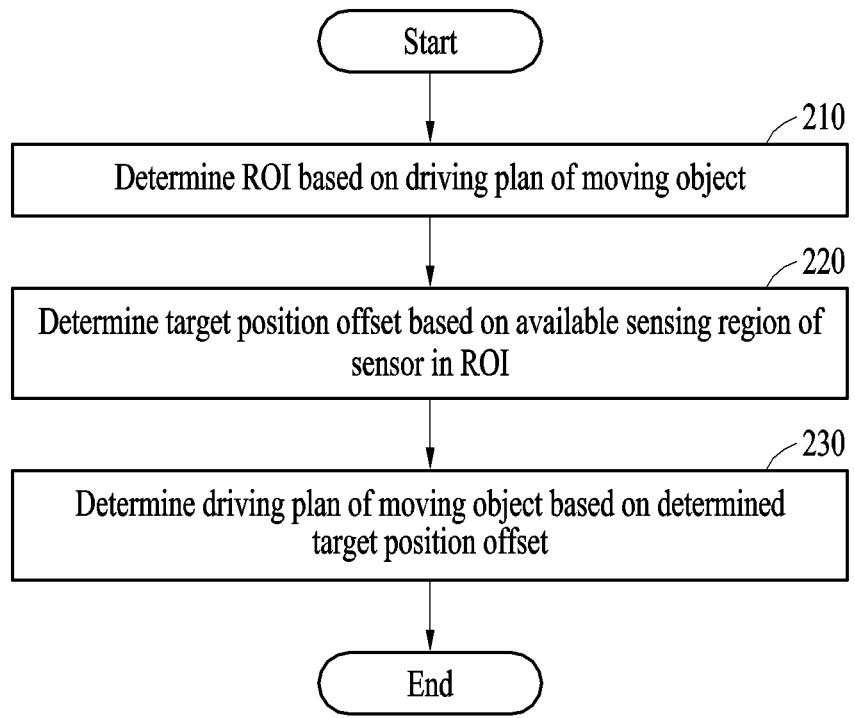
FIG. 2 illustrates an example of an active sensing method of an FOV of a sensor.

FIG. 2 illustrates an example of an active sensing method of an FOV of a sensor. The operations of FIG. 2 may be performed in the sequence and manner as shown. However, the order of some operations may be changed, or some of the operations may be omitted, without departing from the spirit and scope of the shown example. Additionally, operations illustrated in FIG. 2 may be performed in parallel or simultaneously. One or more blocks of FIG. 2, and combinations of the blocks, can be implemented by special purpose hardware-based computer that perform the specified functions, or combinations of special purpose hardware and instructions, e.g., computer or processor instructions. For example, operations 210 through 230 may be performed by a computing apparatus (e.g., processor 1720 of the electronic device 1700). In addition to the description of FIG. 2 below, the descriptions of FIG. 1 are also applicable to FIG. 2.

In operation 210, an electronic device may determine a region of interest (ROI) based on a driving plan of a moving object. For example, the electronic device may determine a predicted position of the moving object and an ROI based on the driving plan of the moving object. The prediction position of the moving object may represent a position where the moving object is positioned when the moving object moves along the driving plan after a certain amount of time (e.g., an amount of time from the current time point). The ROI may include a region in which the FOV is to be secured for the moving object to move along the driving plan. Description of the determination of the ROI is provided with reference to FIG. 3.

In operation 220, the electronic device may determine a target position offset based on an available sensing region of the sensor in the ROI. As described above, the sensor may be arranged in the moving object and may generate sensing data for a sensing range. For example, the electronic device may select a target position offset based on an available sensing region of the sensor in the ROI determined based on the predicted position. In some examples, the target position offset represents an offset applied to the predicted position of the moving object. The target position offset may represent an offset that, when applied, increases or maximizes the available sensing region of the sensor based on the predicted position of the moving object in operation 210. The position offset is described further with reference to FIG. 5 and determination of the target position offset is described further with reference to FIGS. 6 to 8.

In operation 230, the electronic device may determine a driving plan of the moving object based on the target position offset. For example, the electronic device may determine the driving plan of the moving object based on the target position offset. The electronic device may determine the driving plan such that it causes the moving object to pass through a point where the target position offset is applied to the predicted position of the moving object or an adjacent point thereof. Accordingly, the electronic device may cause the moving object to actively drive along an optimal position for active sensing rather than passively use sensing data. The electronic device may determine a more active driving plan through actively secured information of an additional sensing region.

Figure 3:
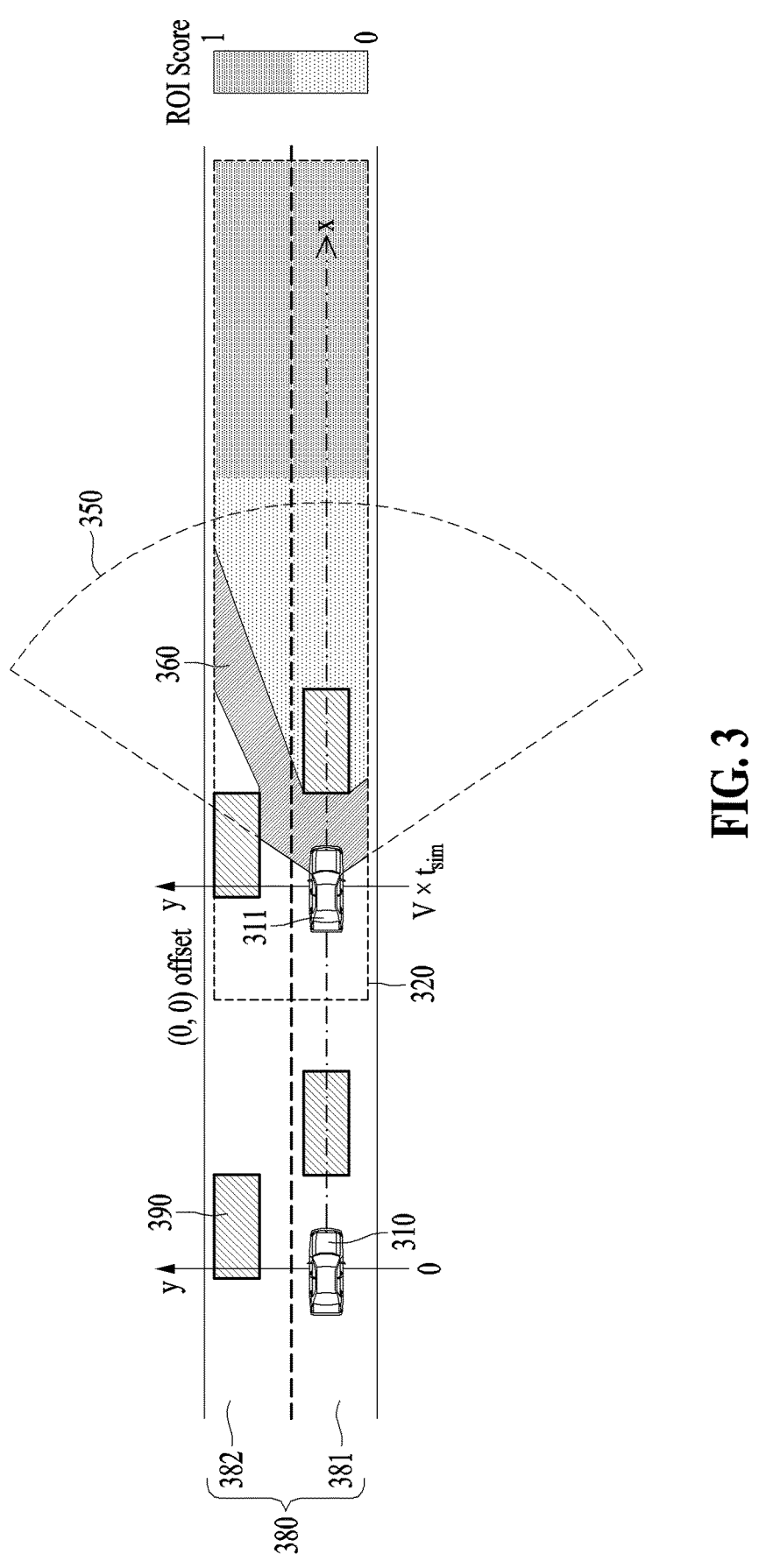
FIG. 3 illustrates an example of a region of interest (ROI).

FIG. 3 illustrates an example of an ROI.

In some examples, an electronic device may select an ROI corresponding to a driving plan (e.g., an autonomous driving plan or a current driving plan). A ROI 320 may be selected based on a position 311 of a moving object 310 that is predicted. For example, the electronic device may predict the position 311 of the moving object 310 at a prediction time point based on a path along the driving plan of the moving object 310 and a speed (e.g., V) of the moving object 310. The prediction time point represents a time point where a time (e.g., time $t_{sim}$) has elapsed from a reference time point (e.g., a current time point). Referring to FIG. 3, the electronic device may determine the predicted position 311 of the moving object by a position where the moving object 310 moves at a constant speed along a driving lane 381 from the reference time point to the prediction time point. When a position of the moving object 310 on a longitudinal axis (e.g., an x-axis) at the reference time point is 0, the position of the moving object 310 on the longitudinal axis at the prediction time point may be $V \times t_{sim}$. V denotes a velocity of the moving object 310 at the reference time point and $t_{sim}$ denotes a simulated elapsed time from the reference time point to the prediction time point.

In some examples, the electronic device may determine the ROI 320 based on the driving lane 381 of the moving object 310 (which is based on the driving plan) and/or a scheduled driving lane 382. For example, the electronic device may determine the ROI 320 based on a road alignment and the width of a lane corresponding to the driving plan. The ROI 320 may be determined based on the width of the lane or a shape following the road alignment of the lane corresponding to the driving plan based on the predicted position 311 of the moving object. The ROI 320 may include a rear region and/or a front region based on the predicted position 311 of the moving object. The rear region may represent a region of the rear side of the predicted position 311 of the moving object. The front region may represent a region of the front side of the predicted position 311 of the moving object. The ROI 320 illustrated in FIG. 3 may be an example of a region where the length of the front region is longer than the length of the rear region.

The width of the ROI 320 may be determined based on whether the driving plan includes a lane change. For example, when a path based on the driving plan includes only the driving lane 381, the ROI 320 may be determined to be a region having a shape with a length following the road alignment of the driving lane 381 and a width of the driving lane 381. When a path based on the driving plan includes the driving lane 381 and the scheduled driving lane 382, the ROI 320 may be determined to be a region having a shape with a length following the road alignment and widths of the driving lane 381 and the scheduled driving lane 382. For reference, as illustrated in FIG. 3, the driving plan may include a lane change to the left and the ROI 320 may have the width of two lanes (e.g., the driving lane 381 and a left lane of the driving lane 381) in a lateral direction (e.g., the y-axis direction).

The length of the ROI 320 may follow alignment of a road 380 or a lane. In some examples, the electronic device may adjust the length of the ROI 320 based on a velocity of the moving object 310. For example, when a velocity of the moving object 310 is a first velocity, the electronic device may determine the length of the ROI 320 to be a first length. When the velocity of the moving object 310 is a second velocity that is greater than the first velocity, the electronic device may determine the ROI 320 to be a second length that is longer than the first length. In other words, the electronic device may increase the length of the ROI 320 as the velocity of the moving object 310 increases. In another example, the electronic device may decrease the length of the ROI 320 as the velocity of the moving object 310 decreases. In some examples, the electronic device may increase or decrease the length of the ROI 320 based on the velocity of the moving object 310 between a minimum length and a maximum length. For example, the length of the front region may vary depending on the velocity of the moving object 310 and the length of the rear region may be fixed. However, the example is not limited thereto, and in some examples, the length of the rear region may vary depending on the velocity of the moving object 310.

Figure 9:
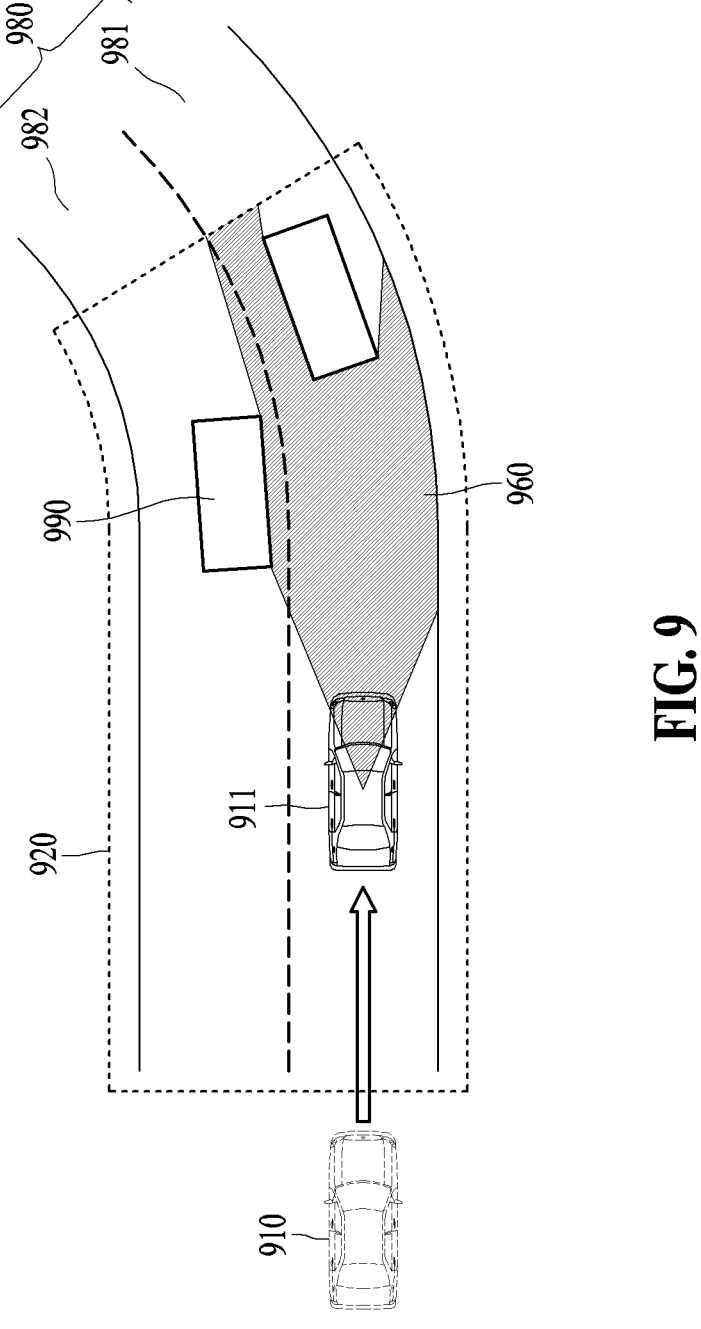
FIG. 9 illustrates an example of a sensing range evaluation in an ROI determined based on a road alignment.

For reference, FIG. 3 illustrates an example in which the ROI 320 has a length in the longitudinal direction (e.g., the x-axis direction) since the road alignment is a straight line. However, the example is not limited thereto, and FIG. 9 illustrates an example of the ROI 320 when the road alignment is a curved line.

For example, the ROI 320 may include a region of a plane parallel with the ground and/or a region of a plane intersecting with the ground. However, the ROI 320 is not limited thereto, and the ROI 320 may be a region in a three-dimensional (3D) space (e.g., a 3D volume). Herein, for ease of description, the description uses an example where the ROI 320 is a region of a 2D plane. The ROI 320 may include a first ROI parallel with the ground and a second ROI intersecting with the ground.

The first ROI parallel with the ground may be a region that is parallel with the ground and has a width corresponding to a single lane or a region that is parallel with the ground and has a width corresponding to more than one lane, such as two lanes. When the driving plan includes keeping the moving object 310 in a lane, the electronic device may determine the ROI 320 (e.g., a region having a width corresponding to a single lane) including a lane (e.g., a current lane) on which the moving object 310 is being driven. When the driving plan includes a turn (e.g., a left turn or a right turn) of the moving object 310, the electronic device may determine the ROI 320 (e.g., a region having a width corresponding to a single lane) to include a portion of the road 380 or a path through which a vehicle passes when the vehicle turns. When the driving plan includes a lane change of the moving object 310, the electronic device may determine the ROI 320 (e.g., a region having a width corresponding to two lanes) to include the current lane of the moving object 310 and a lane that the moving object 310 intends to change into. In some examples, the second ROI intersecting with the ground is further described with reference to FIGS. 10 and 11.

In addition, the electronic device may map a score (e.g., an FOV score) used to evaluate an FOV secured by a sensor with respect to points in the ROI 320. A map in which the FOV score is mapped onto the ROI 320 may be referred to as an FOV score map. The score may be, for example, an FOV reward or an FOV cost. When an FOV reward is mapped onto the ROI 320, the map may be referred to as an FOV reward map and when an FOV cost is mapped onto the ROI 320, the map may be referred to as an FOV cost map. FIG. 3 illustrates an example in which an FOV reward is mapped onto points of the ROI 320. A ROI score may be set to the FOV reward and as the score approaches 0, the point may approach the sensor and as the score approaches 1, the point may move away from the sensor.

The FOV reward map with respect to the ROI 320 may have a higher FOV reward as the point moves away from the sensor and may have a lower FOV reward as the point approaches the sensor. A high FOV reward of the ROI 320 represents that an FOV is secured from a point far from the sensor. Conversely, a low FOV reward of the ROI 320 represents that an FOV is secured from a point close to the sensor. In other words, as the FOV reward increases, more FOV is secured (i.e., a region of active or non-occluded FOV increases).

The electronic device in an example may determine an available sensing region 360 of the sensor to be a region that is not occluded by an obstacle object 390 among an overlapping region of the ROI 320 and a sensing range 350 of the sensor. Similar to the predicted position 311 of the moving object 310, the electronic device may predict that the obstacle object 390 may move based on a velocity (e.g., a velocity of obstacle object 390) and a moving direction at a reference time point. A predicted position of the obstacle object 390 at the prediction time point may be referred to as a predicted obstacle object position. The electronic device may determine the available sensing region 360 for each position offset based on predicted positions of the moving object 310 and of the obstacle object 390. For reference, FIG. 3 illustrates an example in which the position offset is (0,0) and offsets in the longitudinal direction axis (e.g., the x-axis) and the lateral direction axis (e.g., the y-axis) are 0, respectively. In other words, the available sensing region 360 at the predicted position 311 of the moving object is illustrated.

The electronic device may perform a sensor range evaluation based on the available sensing region 360 at an arbitrary position offset. For example, the electronic device may generate sensor range evaluation data based on scores (e.g., an FOV reward) mapped onto points included in the available sensing region 360 of the ROI 320. The sensor range evaluation is further described with reference to FIGS. 6 to 8.

Herein, for ease of explanation, a description is mainly provided with an example in which the FOV reward is mapped onto the ROI 320. However, the example is not limited thereto, and an FOV cost may be mapped to other regions. The FOV reward and the FOV cost may represent a measure for evaluating an FOV of a sensor. The FOV cost map for the ROI 320 may have a lower FOV cost for a point farther away from the sensor and a higher FOV cost for a point closer to the sensor. A low FOV cost in the ROI 320 may represent that an FOV of a point far from the sensor is secured. A high FOV cost in the ROI 320 may represent that an FOV of a point closer to the sensor is secured. In other words, it may indicate that more FOV is secured as the FOV cost decreases.

Figure 10:
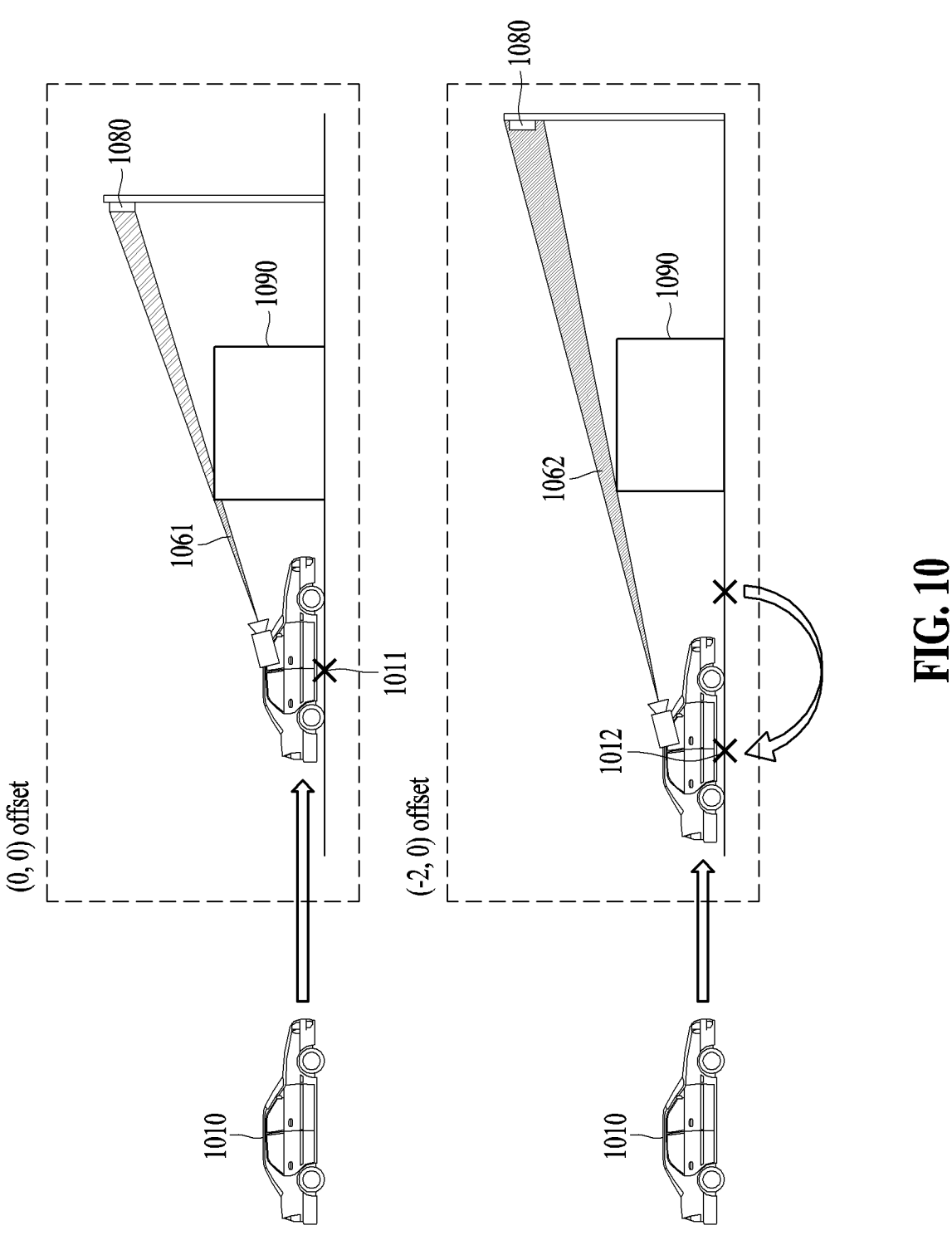
FIGS. 10 and 11 illustrate examples of sensing range evaluations in an ROI including a position spaced apart from the ground.
Figure 11:
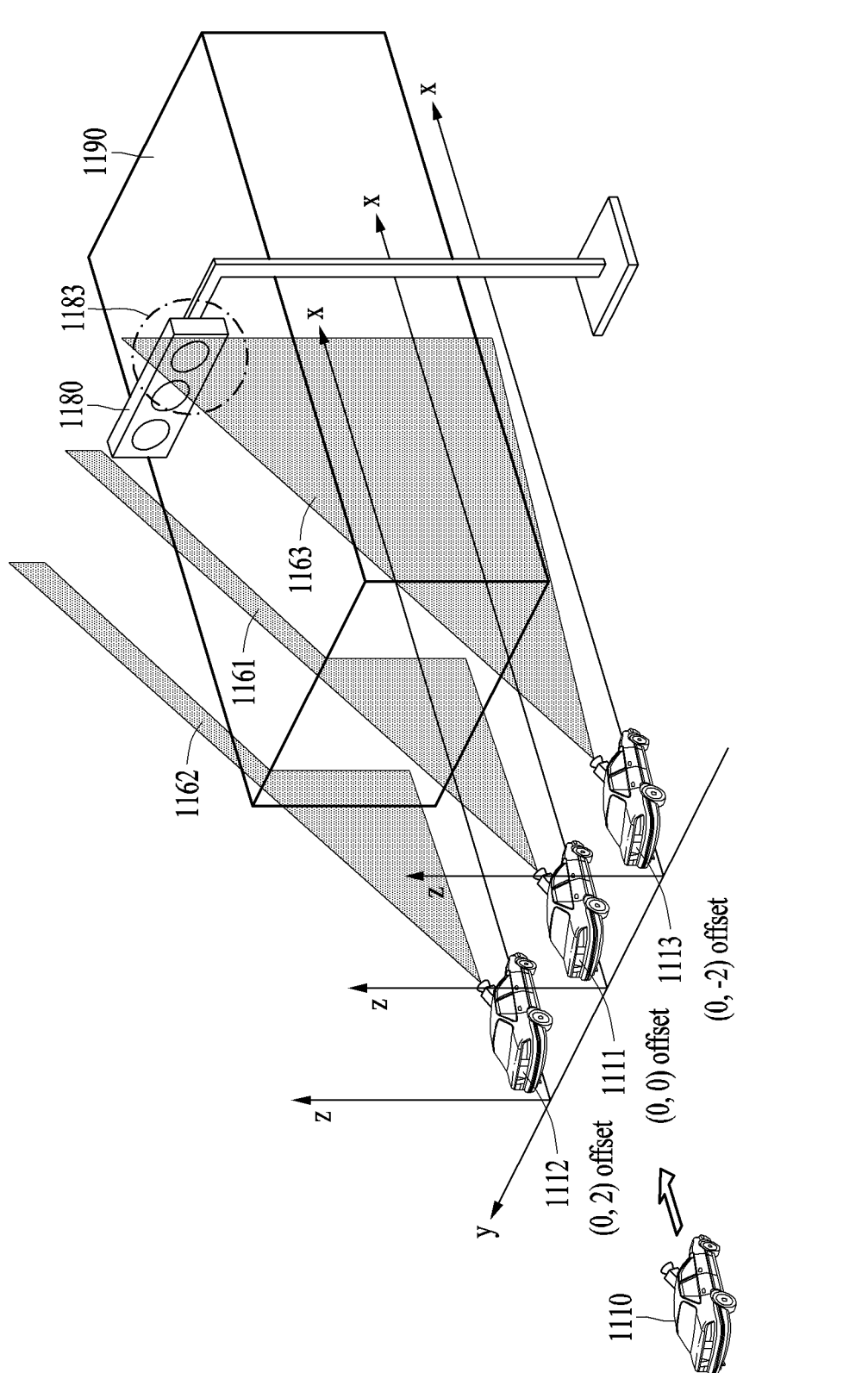

FIGS. 3, 6, 7, 8, and 9 illustrate an example of the first ROI parallel with the ground and FIGS. 10 and 11 illustrate an example of the second ROI perpendicular to the ground. However, the ROI 320 is not limited thereto, and the ROI 320 may be dynamically adjusted based on the predicted position 311 of the moving object including a point in which information is needed to establish a driving plan.

Figure 4:
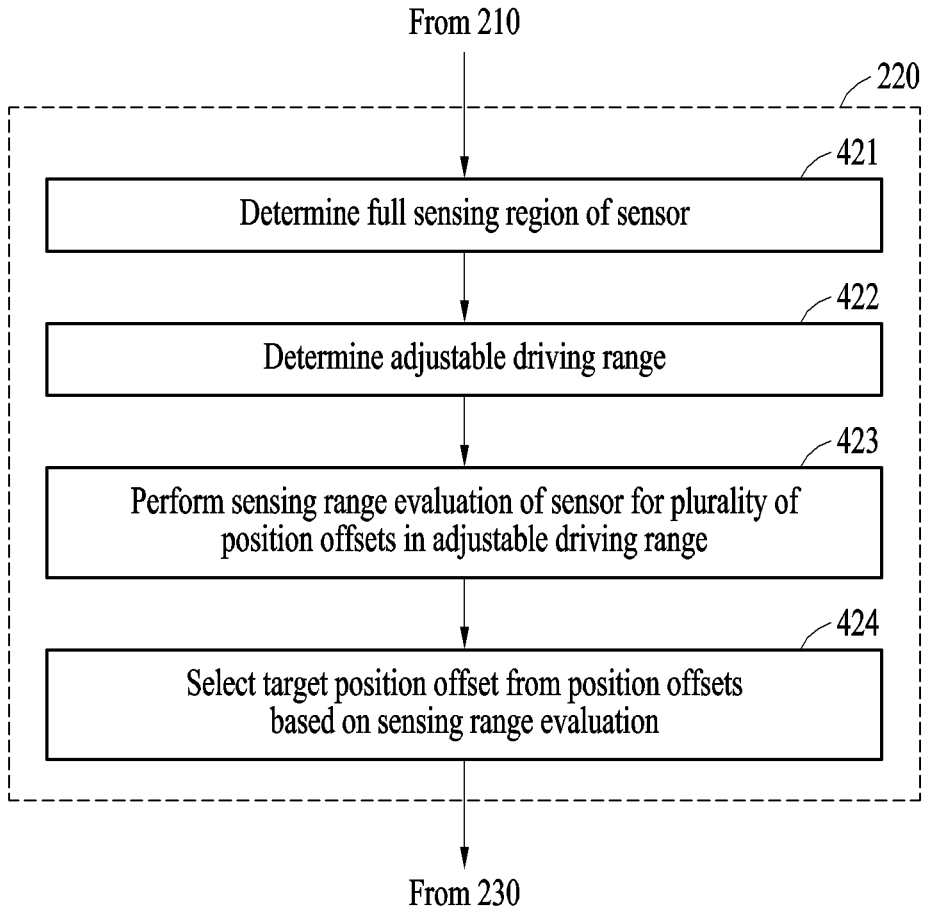
FIG. 4 illustrates an example of selecting a target position offset based on a sensing range evaluation of a sensor.

FIG. 4 illustrates an example of selecting a target position offset based on a sensing range evaluation of a sensor. FIG. 4 illustrates an example of a method of detecting a contaminated portion of a lens of a camera. The operations of FIG. 4 may be performed in the sequence and manner as shown. However, the order of some operations may be changed, or some of the operations may be omitted, without departing from the spirit and scope of the shown example. Additionally, operations illustrated in FIG. 4 may be performed in parallel or simultaneously. One or more blocks of FIG. 4, and combinations of the blocks, can be implemented by special purpose hardware-based computer that perform the specified functions, or combinations of special purpose hardware and instructions, e.g., computer or processor instructions. For example, operations 421 through 424 may be performed by a computing apparatus (e.g., processor 1720 of the electronic device 1700 or processor 1720 of the electronic device 1700). In addition to the description of FIG. 4 below, the descriptions of FIGS. 1-3 are also applicable to FIG. 4.

In operation 421, an electronic device may determine a full sensing region of a sensor. For example, the electronic device may determine the full sensing region based on a predicted position of the moving object and a sensing direction and an angle of field (e.g., FOV) of a sensor mounted on a moving object.

In operation 422, the electronic device may determine an adjustable driving range. The adjustable driving range may be a range in which a driving plan is adjustable or tunable for securing an FOV of the sensor described above. A position offset for evaluating a sensing range may be arranged within the adjustable driving range. The adjustable driving range and a plurality of position offsets (e.g., candidate position offsets) in the adjustable driving range are further described with reference to FIG. 5.

In addition, the electronic device may determine an available sensing region for each position offset. As described above with reference to FIG. 3, the available sensing region may be a region that is not occluded by (or is less occluded by) an obstacle object in an overlapping region of an ROI and the full sensing region of the sensor. The electronic device may detect an obstacle object based on sensing data of the sensor. The electronic device may determine the available sensing region in the ROI based on a result of detecting the obstacle object (e.g., a distance to the obstacle object and the size of the obstacle object). When the obstacle object is detected in the ROI, the electronic device may determine a region between the sensor and the obstacle object to be the available sensing region. For a part where the obstacle object is not detected, the electronic device may determine a region from the sensor to a point corresponding to a maximum sensing distance of the sensor or a region between the sensor and a boundary of the ROI to be the available sensing region.

In operation 423, the electronic device may perform a sensing range evaluation for position offsets in the adjustable driving range. For example, the electronic device may calculate an evaluation score based on the sensing region that is available at each position offset. As the available sensing region includes more points far away from the sensor, a higher evaluation score may be calculated. Sensing being available to a far point from the sensor indicates that the FOV of the sensor is secured to the far point, i.e., in other words the FOV of the sensor is available to the sensor for sensing to the far point. Calculation of the evaluation score is further described with reference to FIGS. 6 to 8.

In operation 424, the electronic device may select a target position offset from among the position offsets based on the sensing range evaluation. For example, by performing the sensing range evaluation for each candidate position offset in operation 423, the electronic device may calculate an evaluation score based on the available sensing region at each of the candidate position offsets. The electronic device may select a target position offset from among the candidate position offsets based on the respective evaluation scores. When the evaluation score is based on an FOV reward, the electronic device may determine the target position offset to be a position offset with the highest sum of FOV rewards. However, the example is not limited thereto and when the evaluation score is based on the FOV cost, the electronic device may determine the target position offset to be a position offset with the lowest sum of FOV costs.

Figure 5:
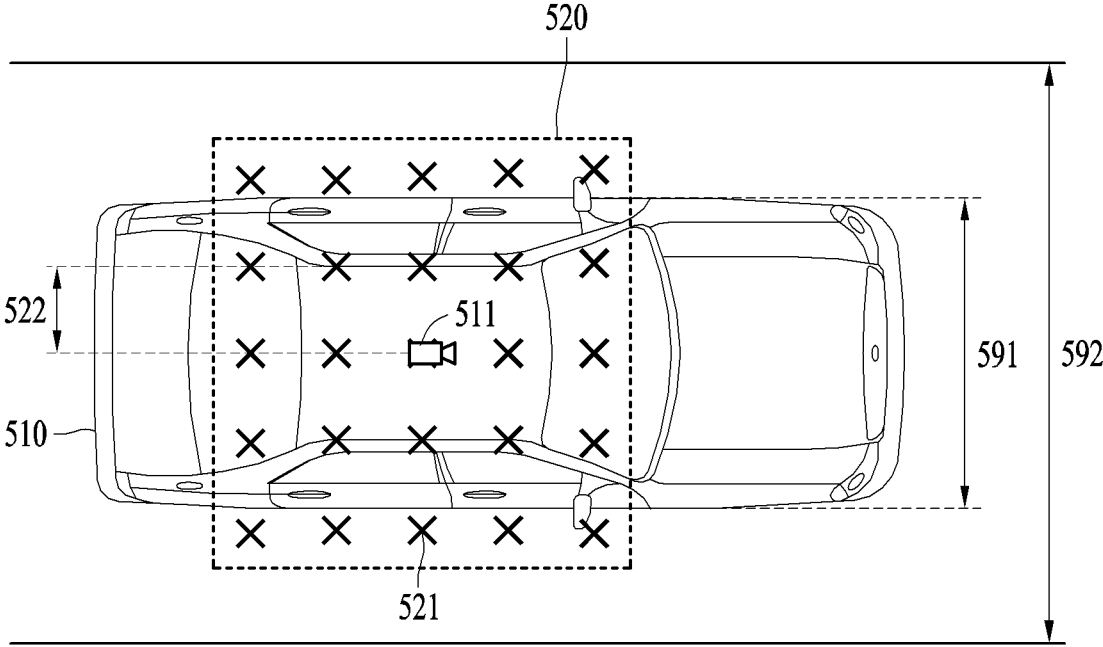
FIG. 5 illustrates an example of candidate position offsets in an adjustable driving range.

FIG. 5 illustrates an example of candidate position offsets in an adjustable driving range.

An electronic device in an example selects an adjustable driving range 520. In some examples, the adjustable driving range 520 is selected to ensure safety and to prevent collisions based on a current or predicted driving situation. For example, the electronic device may determine the adjustable driving range 520 based on a driving lane of a moving object 510. The electronic device may determine the adjustable driving range 520 based on a width 591 of the moving object and a width 592 of a driving lane. The adjustable driving range 520 may be a range for limiting the moving object 510 from escaping from the driving lane. The lateral range of the adjustable driving range 520 may represent a movable range of the moving object 510 where the outer edge (e.g., the side surfaces of the moving object 510) of the moving object 510 does not escape a driving lane region defined by a lane boundary. In other words, the lateral range of the adjustable driving range 520 may be a lateral moving range in which the outer edge of the moving object 510 remains within the driving lane region. However, the lateral range of the adjustable driving range 520 is not limited thereto and in other examples, the lateral range of the adjustable driving range 520 may include a portion corresponding to an adjacent lane to the driving lane.

The examples of FIG. 5 illustrate that the length of the longitudinal range of the adjustable driving range 520 is the same as the length of the lateral range but is not limited thereto. The longitudinal range of the adjustable driving range 520 may vary depending on design. For example, the longitudinal range of the adjustable driving range 520 may vary depending on the velocity of the moving object 510. When the velocity of the moving object 510 increases, the longitudinal range of the adjustable driving range 520 may increase and when the velocity of the moving object 510 decreases, the longitudinal range may decrease.

In some examples, the electronic device may select a target position offset in the adjustable driving range 520 based on the predicted position of the moving object. A plurality of position offsets 521 may be in the adjustable driving range 520. For each position offset shown in FIG. 5, the point where the sensor 511 is disposed on the moving body 510 is set as a zero point (e.g., (0,0) offset), and the plurality of position offsets 521 may be spaced apart from each other. As described above, the plurality of position offsets 521 may be within a range in which deviation of the moving object 510 from a driving lane is limited. The adjustable driving range 520 may include at least four position offsets 521. For example, the plurality of position offsets 521 in the adjustable driving range 520 may include an offset spaced apart in the front direction based on the predicted position of the moving object, an offset spaced apart in the rear direction, an offset spaced apart in a first side direction (e.g., the left side based on the moving direction of the moving object 510), and an offset spaced apart in a second side direction (e.g., the right side based on the moving direction of the moving object 510) opposite to the first side direction.

In some examples, the unit interval 522 (e.g., 50 cm) between the position offsets 521 is illustrated as being an equal interval with respect to the longitudinal direction (e.g., the x-axis) and the lateral direction (e.g., the y-axis), however the example is not limited thereto. For example, in FIG. 6, a (−2, 2) offset may represent an offset spaced apart by −2 of the unit interval 522 in the longitudinal direction and by 2 of the unit interval 522 in the lateral direction based on the zero point (origin). In other words, the (−2, 2) offset may be an offset spaced apart from the zero point (e.g., the predicted position of the moving object) by 2 of the unit interval 522 in the backward direction and by 2 of the unit interval 522 in the left direction based on the moving direction of the moving object 510. Similarly, in another example illustrated in FIG. 7, a (2, 2) offset may represent an offset spaced apart from the zero point by 2 of the unit interval 522 in the longitudinal direction and by 2 of the unit interval 522 in the lateral direction. In other words, the (2, 2) offset may represent an offset spaced apart from the predicted position of the moving object by 2 of the unit interval 522 in the forward direction and by 2 of the unit interval 522 in the left direction. In another example illustrated in FIG. 8 an offset of (−2, 0) may represent an offset spaced apart from the zero point by −2 of the unit interval 522 in the longitudinal direction based on the zero point (origin). In other words, the (−2, 0) offset may represent an offset spaced apart from the predicted position of the moving object by 2 of the unit interval 522 in the rear direction.

In some examples, the description is provided with the number of candidate position offsets 521 and the interval 522 between the candidate position offsets 521 being fixed, but is not limited thereto. For example, the number of position offsets 521 and the interval 522 between the position offsets 521 in the adjustable driving range 520 may be designed to vary depending on the velocity of the moving object 510.

Figure 6:
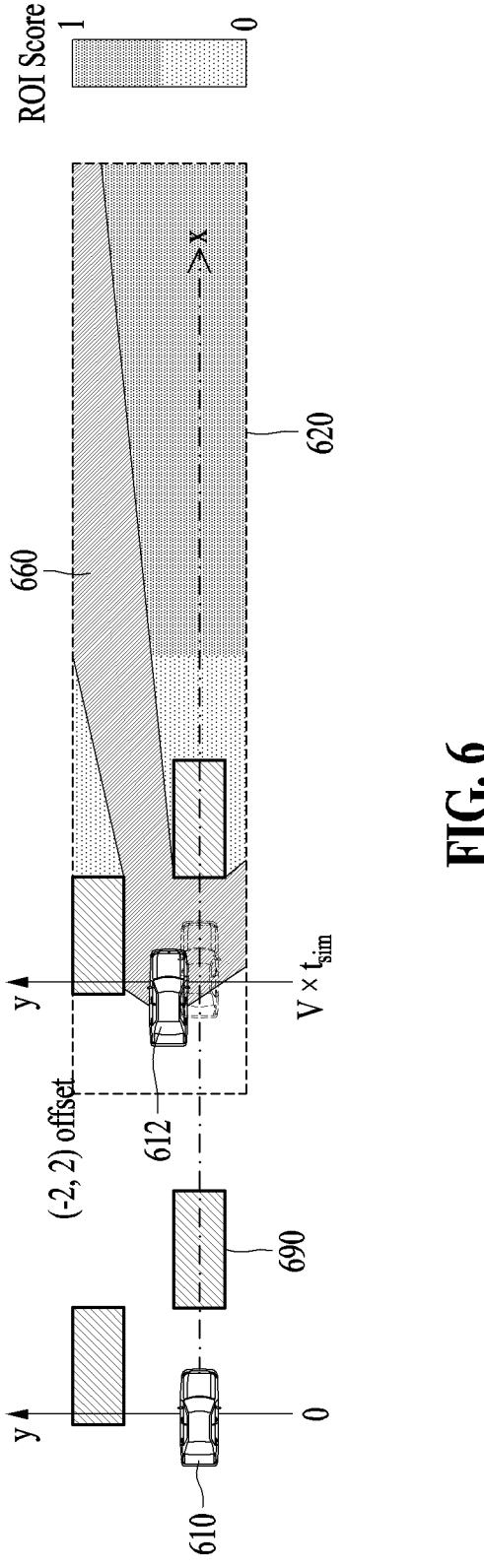
FIGS. 6 to 8 illustrate examples of sensing range evaluations for each candidate position offset.
Figure 7:
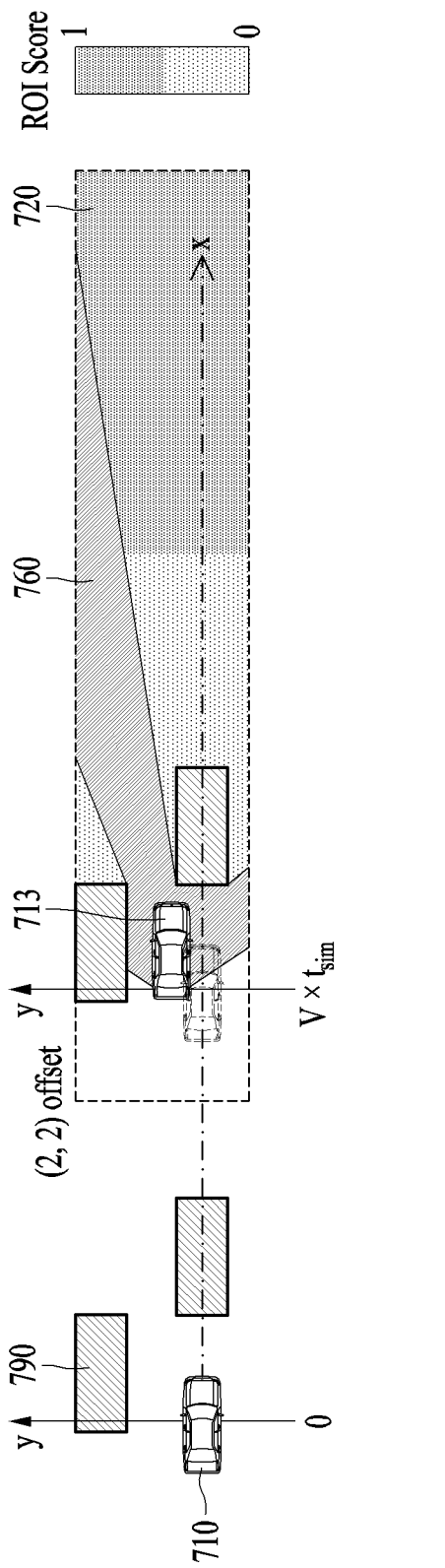
Figure 8:
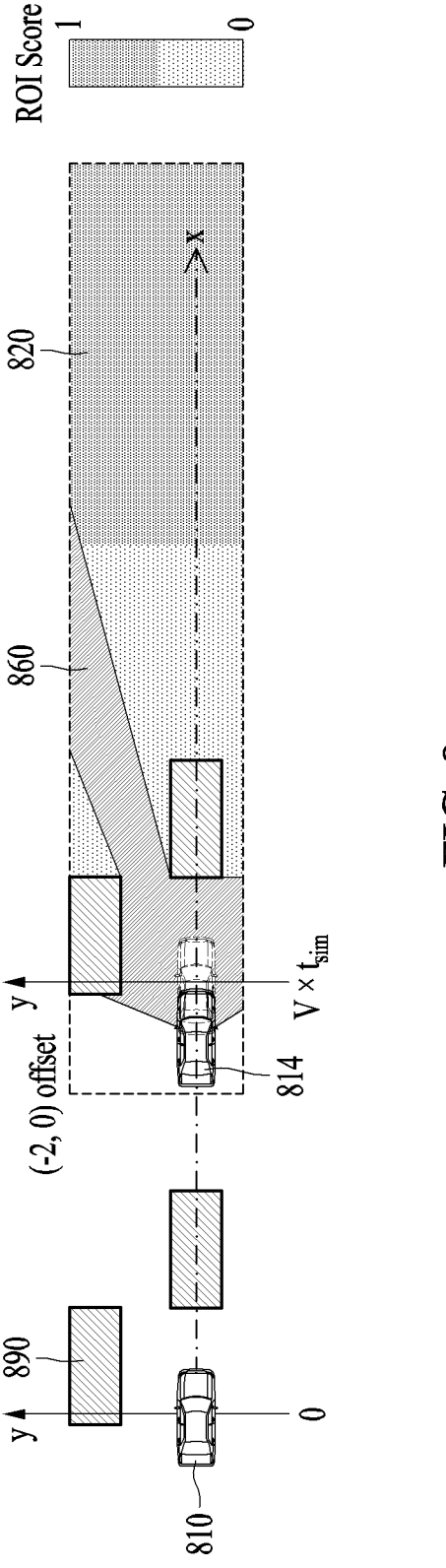

In an example the electronic device may select a target position offset from the plurality of position offsets 521. As described above, the electronic device may select the target position offset based on an FOV range evaluation of the sensor 511 at each position offset. FIGS. 6 to 8 further describe the FOV range evaluation by position offset.

FIGS. 6 to 8 illustrate examples of sensing range evaluations for each candidate position offset.

For example, in FIGS. 6 to 8, similar to FIG. 3, a driving plan may include a lane change to a left lane based on a moving direction of moving objects 610, 710, and 810. When changing to the left lane, FOV information of the left side is important, and thus, for ease of description, among the plurality of position offsets, FOV range evaluations at candidate position offsets adjacent to the left lane compared to the zero point are described as an example. However, this does not exclude FOV range evaluation at remaining candidate position offsets. Similar to FIG. 3, predicted positions of the moving objects and predicted positions of obstacle objects 690, 790, and 890 at a prediction time point may be determined based on an individual velocity and moving direction at a reference time point. Illustrated are available sensing regions 660, 760, and 860 at a position where a position offset is applied to a zero point and the zero point is the predicted position of the moving object.

In some examples, the electronic device may simulate FOVs of the sensor at position offsets. For example, the electronic device may select a target position offset from among the plurality of position offsets based on sensor range evaluations at each of the plurality of position offsets in the adjustable driving range. For example, the electronic device may generate the sensor range evaluation for the corresponding position offset based on a score assigned to points included in ROIs 620, 720, and 820 and the available sensing regions 660, 760, and 860 for each position offset.

For each of the position offsets, the electronic device may perform a respective sensor range evaluation based on a position in which the corresponding position offset is applied to the predicted position of the moving object. For example, in FIG. 6, the electronic device may determine the available sensing region 660 at a position 612 in which a (−2, 2) offset is applied to the predicted position of the moving object 610. In FIG. 7, the electronic device may determine the available sensing region 760 at a position 713 in which a (2, 2) offset is applied to the predicted position of the moving object 710. In FIG. 8, the electronic device may determine the available sensing region 860 at a position 814 in which a (−2, 0) offset is applied to the predicted position of the moving object 810.

For each of the position offsets, the electronic device may calculate an evaluation score for the position offset based on scores assigned to points included in the available sensing regions 660, 760, and 860 of the sensor among the plurality of points. The electronic device may identify an FOV score assigned to a point in the ROIs 620, 720, and 820 corresponding to the available sensing regions 660, 760, and 860. The ROIs 620, 720, and 820 described above may include a plurality of points including a first point close to the sensor and a second point far away from the sensor. Different scores may be assigned to the first point and the second point in the ROIs 620, 720, and 820. In FIGS. 6 to 8, an example of mapping an FOV reward (e.g., an ROI score) as scores onto the ROIs 620, 720, and 820 is illustrated. A score (e.g., an FOV reward) assigned to the second point may be greater than a score assigned to the first point. In other words, as a distance of a point from the sensor increases, a higher FOV reward score may be mapped onto the point. A map in which an FOV score is mapped onto an ROI may be referred to as an FOV score map (e.g., an FOV reward map).

For example, the electronic device may evaluate a sensing range of the sensor at each position (e.g., positions corresponding to position offsets based on the predicted position of the moving object) in the adjustable driving range, based on the FOV score map described above. For example, the electronic device may perform a sensing range evaluation of the sensor for each position offset. Evaluation data based on the sensing range evaluation may include a sum of FOV scores of the available sensing regions 660, 760, and 860 of the sensor in the ROIs 620, 720, and 820, respectively.

The electronic device in an example may select a target position offset from the position offsets based on the sensing range evaluations described above. For example, the electronic device may select the target position offset from the position offsets based on a calculated evaluation score. The electronic device may select the target position offset from the position offsets based on sums of FOV scores, which are individually calculated for the respective position offsets. For example, the electronic device may compare the sensing range evaluations (e.g., the sums of FOV scores) for the position offsets. The electronic device may determine the target position offset to be a position offset in which the sum of the FOV rewards is the greatest. For example, the electronic device may select the target position offset based on Equation 1 shown below.

$$\operatorname*{argmax}_{i \in \mathit{Offsets}} \sum_{x,y \exists FoV_i} \mathrm{ROI\_Score}_{x,y} \qquad \text{Equation 1}$$

In Equation 1, FOV, denotes available sensing regions 660, 760, and 860 in the ROIs 620, 720, and 820 for an i-th position offset. $\mathrm{ROI\_Score}_{x,y}$ represents an FOV score of a point (e.g., a longitudinal coordinate x, a lateral coordinate y) included in the available sensing regions 660, 760, and 860 for the i-th position offset. In Equation 1, an example in which the FOV score is an FOV reward score is described. As shown in Equation 1, the electronic device may indicate a target position offset with the greatest sum of FOV scores. The electronic device may determine an active sensing position to be a position spaced apart from the predicted position of the moving object (e.g., a zero point) by the target position offset. The active sensing position may represent a position in which a sensor FOV increases or is maximized in an adjustable driving range. As described above, the target position offset (or the active sensing position) with the maximum sum of FOV rewards may be interpreted as an offset (or a position) in which the FOV of the sensor is maximized in the given driving plan.

For example, referring to FIGS. 6 to 8, a sum of FOV scores in the available sensing region 660 at the (−2, 2) offset of FIG. 6 may be greater than sums of FOV scores in the available sensing regions 760 and 860 at the other offsets. The electronic device may select the target position offset based on a weighted score depending on a distance from the sensor rather than a simple area size of the available sensing region. Accordingly, the electronic device may efficiently secure an FOV over a longer distance.

FIG. 9 illustrates an example of a sensing range evaluation in an ROI that is determined based on an alignment of a road.

As described above, an ROI 920 may be determined based on the width of a lane or a shape of a lane corresponding to a driving plan along the road alignment and the width of the lane. The ROI 920 may be determined based on a predicted position 911 of the moving object. For ease of understanding, FIG. 9 illustrates an example in which a road on which a moving object 910 drives is a curved road 980. The electronic device may determine the ROI 920 having a shape that follows the alignment of the curved road 980 and has a width of a lane in the road 980 (e.g., a driving lane 981 and an adjacent lane 982). The electronic device may determine an available sensing region 960 within the ROI 920 based on a linearity of a signal that can be sensed by a sensor. For example, the available sensing region 960 may be a region between the sensor and points corresponding to the shortest distance among a distance from the sensor to an obstacle object 990 in an angle of field (FOV) of the sensor, a distance to a boundary of the ROI 920, and a maximum sensing distance within the FOV of the sensor.

FIGS. 3 to 9 mainly describe a first ROI parallel with the ground and FIGS. 10 and 11 describe a second ROI intersecting with the ground. For reference, herein, a full sensing region and an available sensing region for the first ROI are illustrated as a region facing the ground in a perpendicular direction.

FIGS. 10 and 11 illustrate examples of sensing range evaluations in an ROI including a position spaced apart from the ground.

In some examples, an electronic device may determine that information of a landmark 1080 or 1180 is needed based on predicting an approach of a moving object 1010 or 1110 to the landmark 1080 or 1180, respectively, based on a driving plan. In some examples, the electronic device may determine whether the moving object 1010 or 1110 plans to approach the landmark 1080 or 1180 based on the driving plan and map data. In some examples, when a distance between a predicted position 1011 or 1111 of the moving object and the landmark 1080 or 1180 is less than a threshold distance, the electronic device may determine that the moving object 1010 or 1110 plans to approach the landmark 1080 or 1180. In some examples, the distance between a position of the moving object 1011 or 1111 and the landmark 1080 or 1180 may be calculated based on position coordinates of the moving object based on a global navigation satellite system (GNSS) signal and geographic information (e.g., geographic coordinates of the landmark 1080 or 1180) of the map data. The map data may include information related to a map and may include, for example, information related to the landmark 1080 or 1180, such as, for example, a type of the landmark 1080 or 1180, a geographical position of the landmark 1080 or 1180, the size of the landmark 1080 or 1180, a shape of the landmark 1080 or 1180, and the height of the landmark 1080 or 1180. The landmark 1080 or 1180 may be spaced apart from the ground. In order to secure an FOV for the landmark 1080 or 1180, an ROI in which an FOV score is mapped onto points spaced away from the ground may be used.

The landmark 1080 or 1180 may represent an object fixed at an arbitrary geographic position to provide information that is needed for a driver to drive on a road. The landmark 1080 or 1180 may include, for example, a traffic sign, a traffic light, or a branch of a tree overhanging the road. For reference, according to the Korean Road Traffic Act, the landmark 1080 or 1180 may be classified into six classes. For example, the landmark 1080 or 1180 may be classified into a warning sign, a regulation sign, an indicating sign, an assistance sign, a road marking, a signal, and the like. However, the type of the landmark 1080 or 1180 is not limited thereto and the type may vary by country and geographic location.

For example, when a driving plan requires information of the traffic landmark 1080 or 1180 (e.g., a traffic safety sign or signal at a distance from the ground surface), the electronic device may determine an ROI including a point corresponding to the height of the traffic landmark 1080 or 1180 based on the predicted position 1011 or 1111 of the moving object. When the moving object 1010 or 1110 approaches an object (e.g., the landmarks 1080 and 1180) providing traffic information based on the driving plan, the electronic device may determine an ROI including a point corresponding to a height at which the object is spaced away from the ground surface. A second ROI intersecting with the ground may be a region including a point corresponding to the height of the landmark 1080 or 1180 spaced away from the ground surface. The second ROI may be, for example, a region of a plane intersecting with the ground. For example, an FOV score (e.g., an FOV reward score) mapped onto points corresponding to the landmark 1080 or 1180 in the second ROI may be greater than an FOV score mapped onto points corresponding to a non-landmark.

Referring to FIG. 10, the electronic device may determine an ROI perpendicular to the ground based on the predicted position 1011 of the moving object. The electronic device may determine available sensing regions 1061 and 1062 in the ROI. When an FOV of the sensor is occluded by the obstacle object 1090, the available sensing region 1061 of the sensor is limited and the landmark 1080 (e.g., a traffic light) may be invisible to the sensor. At a position 1012 (e.g., a rear position in the longitudinal direction based on a zero point) to which a (−2, 0) offset is applied based on the predicted position 1011 of the moving object, the available sensing region 1062 of the sensor may extend to the landmark 1080. This is because an additional FOV of the sensor is secured as a distance between the obstacle object 1090 and the moving object 1010 increases.

FIG. 10 describes an example in which the same ROI is set with respect to a longitudinal offset, but the examples are not limited thereto. Referring to FIG. 11, an ROI may be set for lateral offsets. FIG. 11 illustrates that the longitudinal axis is an x-axis, the lateral axis is a y-axis, and the vertical axis is a z-axis. Referring to FIG. 11, the electronic device may determine an ROI perpendicular to the ground based on the predicted position 1111 of the moving object. The electronic device may determine available sensing regions 1161, 1162, and 1163 in the ROI. When an FOV of the sensor is occluded by the obstacle object 1190, the available sensing region 1161 and 1162 of the sensor is limited and the landmark 1180 (e.g., a traffic light) may be invisible to the sensor.

At positions 1112 and 1113 to which a lateral offset is applied compared to a zero point of position 1111, an electronic device may determine an available sensing region in the ROI. As described above, ROIs perpendicular to the ground may have a weighted FOV score at a point corresponding to a landmark. As illustrated in FIG. 11, an available sensing region 1163 at the position 1113 corresponding to a (0, −2) offset (e.g., an offset moved by 2 of a unit interval in the lateral direction) may have a higher sum of FOV scores (e.g., a sum of FOV reward scores) compared to the available sensing regions 1161 and 1162 at positions 1111 and 1112 corresponding to the other offsets. This is because the available sensing region 1163 includes the point 1183 corresponding to the landmark 1180. Accordingly, the electronic device may determine the (0, −2) offset to be the target position offset for securing the FOV for the landmark.

However, herein, description is provided that the ROI and the available sensing region are the same plane for ease of description but is not limited thereto. The ROI may be a region in a 3D space (e.g., a 3D volume) and an FOV score may be mapped onto points in the 3D volume. The available sensing region may be calculated by the 3D volume and a sensing range evaluation for each position offset may be performed based on a sum of FOV scores mapped onto 3D points in the available sensing region.

Figure 12:
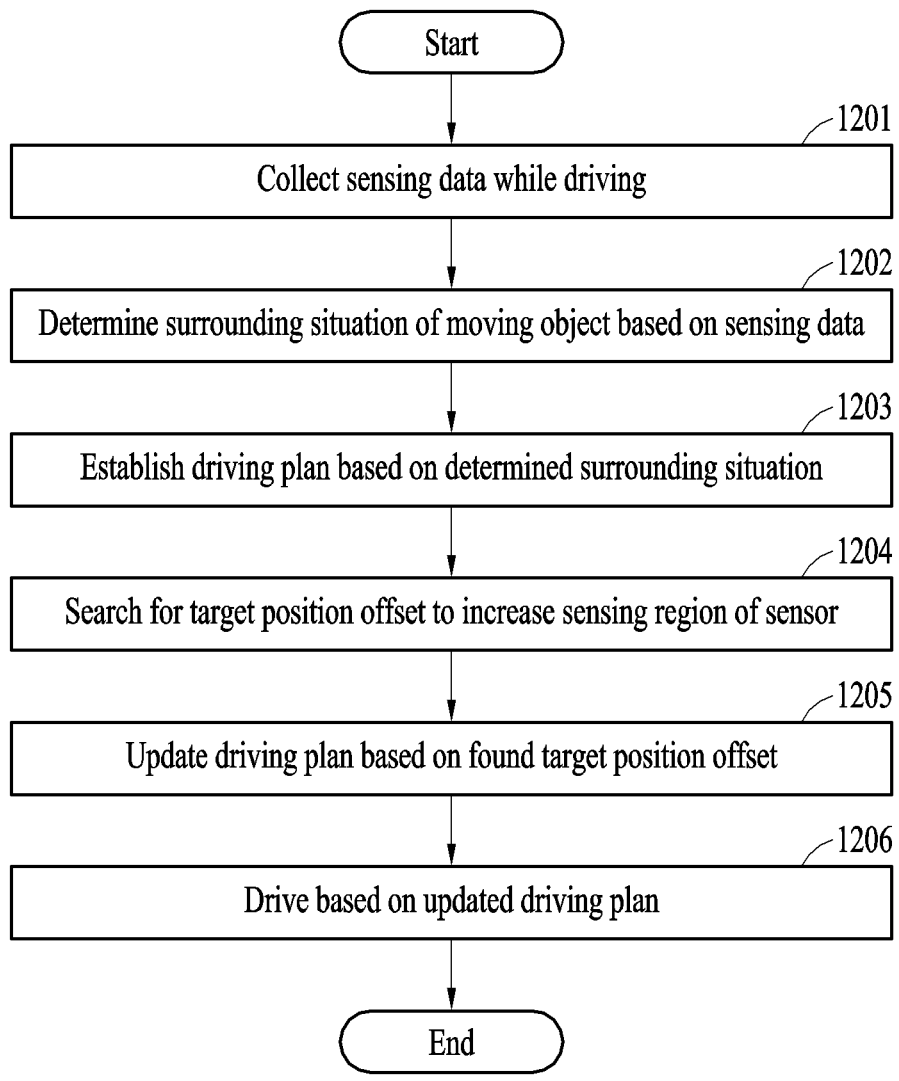
FIG. 12 illustrates an example of a method of generating a driving plan using active sensing of a sensor view.

FIG. 12 illustrates an example of a method of generating a driving plan using active sensing of a sensor view. FIG. 12 illustrates an example of a method of detecting a contaminated portion of a lens of a camera. The operations of FIG. 12 may be performed in the sequence and manner as shown. However, the order of some operations may be changed, or some of the operations may be omitted, without departing from the spirit and scope of the shown example. Additionally, operations illustrated in FIG. 12 may be performed in parallel or simultaneously. One or more blocks of FIG. 12, and combinations of the blocks, can be implemented by special purpose hardware-based computer that perform the specified functions, or combinations of special purpose hardware and instructions, e.g., computer or processor instructions. For example, operations 1201 through 1206 may be performed by a computing apparatus 1700 (e.g., processor 1720 of an electronic device 1700 or processor 1820 of the electronic device 18500). In addition to the description of FIG. 12 below, the descriptions of FIGS. 1-11 are also applicable to FIG. 12.

In operation 1201, an electronic device may collect sensing data during driving. For example, the electronic device may generate sensing data for a surrounding environment through one or more sensors arranged in a moving object. For ease of description, the description of sensing by mainly one sensor is provided but is not limited thereto. When a plurality of sensors is arranged in the moving object, the electronic device may collect sensing data using the plurality of sensors.

In operation 1202, the electronic device may determine a surrounding situation of a moving object based on the sensing data. For example, the electronic device may detect an object from the sensing data. The electronic device may identify an obstacle object or a landmark in the sensing data. The electronic device may determine the size and type of the obstacle object and may estimate a distance to the obstacle object. In addition, the electronic device may detect traffic information (e.g., a stop sign or a moving sign of a traffic light) indicated by the landmark and may estimate a distance to the landmark. However, determination of the surrounding situation based on the sensing data is not limited thereto, and the electronic device may determine various pieces of information related to driving of the moving object using the sensing data.

In operation 1203, the electronic device may establish a driving plan based on the determined surrounding situation. For example, the electronic device may establish a driving plan to a destination while preventing collision with a surrounding obstacle object. For example, the driving plan may include a path heading to at least one of a travel destination and an intermediate destination based on a driving maneuver of a user. The travel destination may be a final destination to which a driver heads. The intermediate destination may be a point to be passed through in a road while heading to the travel destination or an intermediate point determined by a driving maneuver (e.g., a maneuver for turning on a signal light as an intended maneuver to change a lane or a change of a vehicle direction) of the user. For example, when an intended driving maneuver is input by a user to change a lane during driving, the electronic device may set a point on a lane to be changed as the intermediate destination.

The electronic device in an example may monitor an FOV of the sensor during driving based on the driving plan described above. The electronic device may determine whether the FOV of the sensor is sufficiently secured by comparing obtained sensor information to the performance of the sensor. When the FOV of the sensor is insufficient, the electronic device may search for a position or a position offset to secure the FOV of the sensor. For example, the electronic device may determine an unavailable sensing region at a moving object position at a reference time point (e.g., a current time point). In some examples, when a ratio of the unavailable sensing region to the total sensing area of the sensor exceeds a threshold, the electronic device may attempt or initiate a search for a position offset to increase an available sensing region of the sensor. In some examples, the electronic device may continue to drive based on the currently established driving plan when the ratio of the unavailable sensing region is less than or equal to the threshold.

In operation 1204, the electronic device may search for a target position offset to increase a sensing region of the sensor. The electronic device may set an ROI based on an autonomous driving plan. Setting of the ROI and searching for the target position offset are described with reference to FIGS. 1 to 11.

In operation 1205, the electronic device may update the driving plan based on the target position offset that is determined. The electronic device may determine a driving plan based on the target position offset. For example, the electronic device may update the driving plan to pass through a point corresponding to the target position offset or an adjacent point based on a predicted position of the moving object. The electronic device may determine an active sensing position based on the target position offset. The electronic device may generate an active sensing position layer based on the active sensing position. The electronic device may update the driving plan (e.g., a driving path) using various driving information layers including the active sensing position layer. Updating the driving plan based on the target position offset is further described with reference to FIGS. 13 and 14.

In operation 1206, the electronic device may control the moving object to drive based on the updated driving plan.

For example, the driving plan may control at least one of the velocity, acceleration, and steering of the vehicle based on the updated driving plan.

As described above, the electronic device in an example may recognize a surrounding situation more accurately and diversely by searching for the active sensing position. The electronic device may perform safer and more efficient autonomous driving by additionally generating various pieces of information required for an autonomous driving plan.

Figure 13:
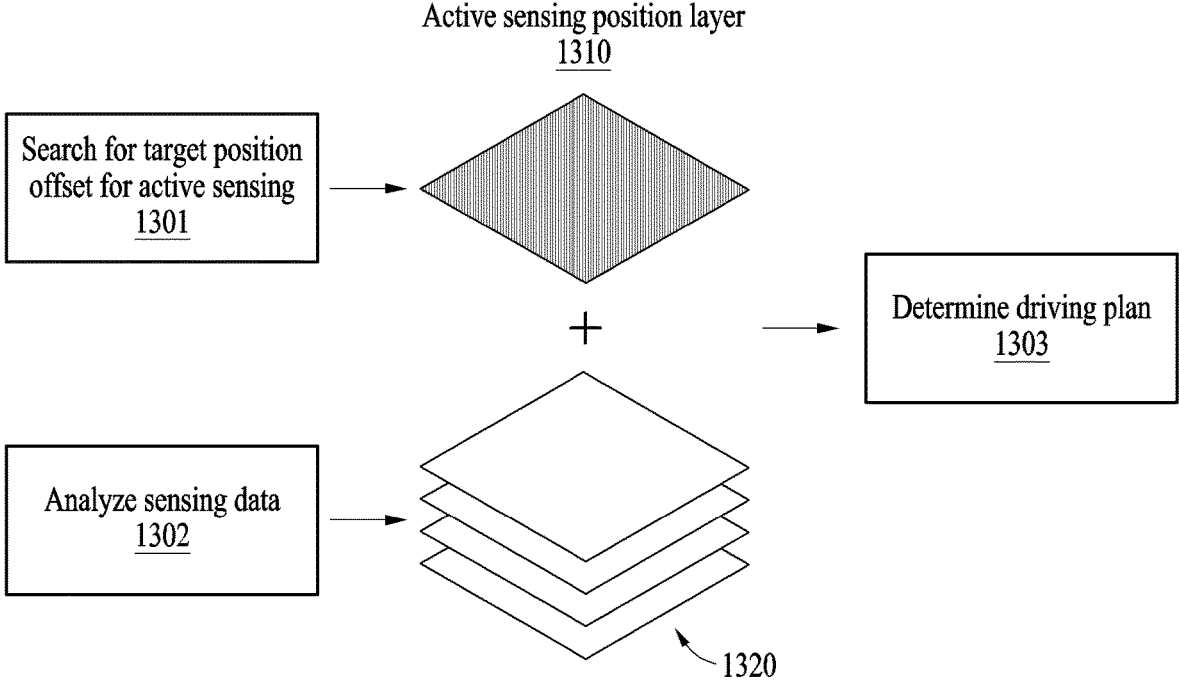
FIGS. 13 and 14 illustrate an example of determining a driving plan using an active sensing position layer.
Figure 14:
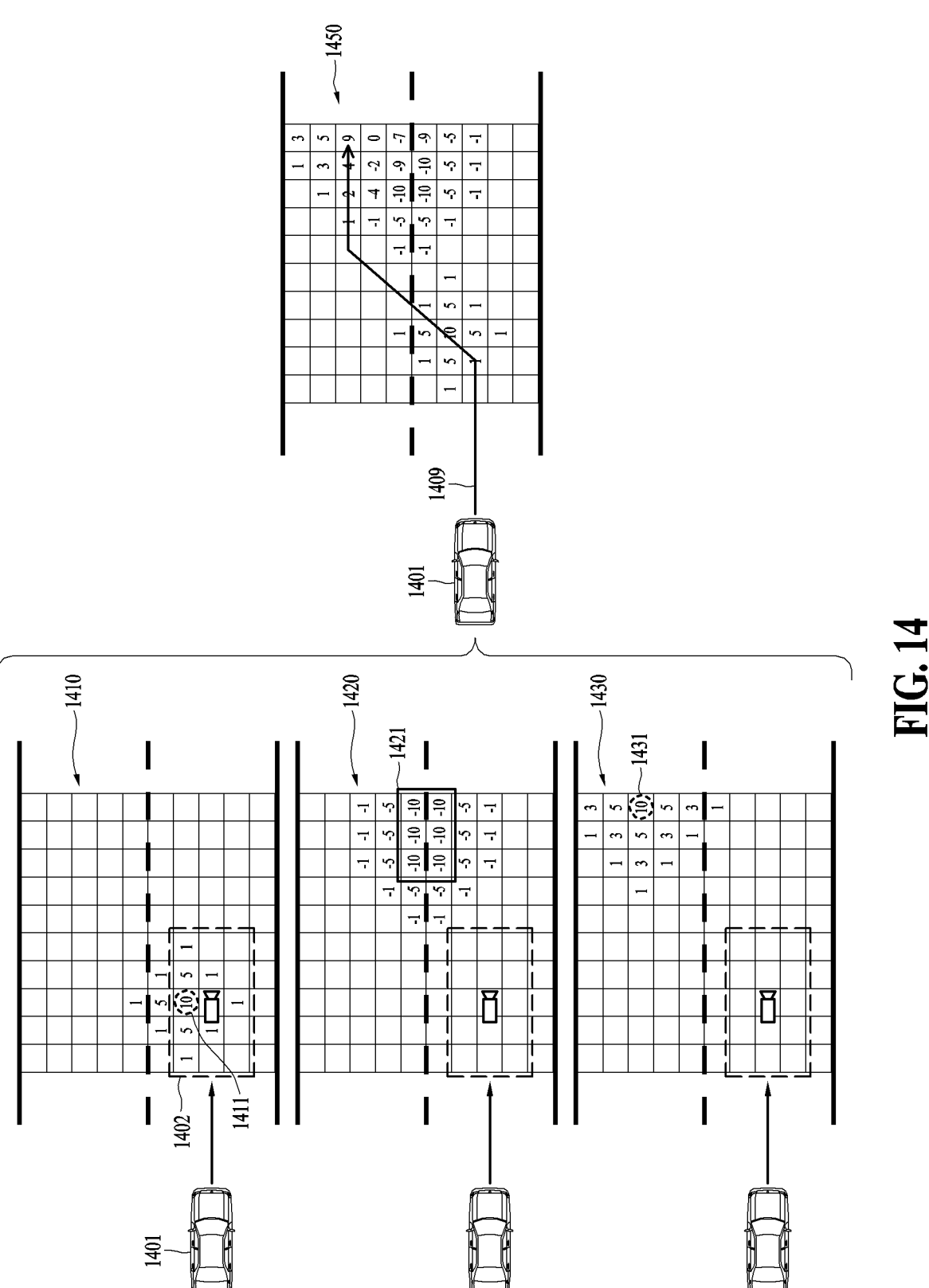

FIGS. 13 and 14 illustrate an example of determining a driving plan using an active sensing position layer.

In operation 1301, the electronic device may search for a target position offset for active sensing. For example, as described with reference to FIGS. 1 to 11, the electronic device may determine a position offset in which an available sensing region of a sensor increases based on a predicted position of the moving object.

In some examples, the electronic device may generate an active sensing layer 1310 indicating a position corresponding to the target position offset. The electronic device may determine an active sensing position to be a position spaced apart from the predicted position of the moving object by the target position offset. The active sensing position may represent a position in which an FOV of the sensor increases or is maximized in a given driving plan. The electronic device may generate the active sensing position layer 1310 indicating an active sensing position. The active sensing position layer 1310 may represent a layer in which a driving score is mapped onto the active sensing position and an adjacent position to the active sensing position. The driving score may represent a score that is a criterion for establishing a driving plan. For example, the active sensing position layer may include a grid map including a score (e.g., a driving reward score) related to the active sensing position. In some examples, the scale of an ROI may be different from the scale of the active sensing position layer 1310. The electronic device may convert coordinates of the active sensing position in the ROI into grid coordinates of the grid map. The electronic device may map the driving score based on the converted coordinates. The active sensing position layer 1310 may be used to establish or update the driving plan by considering scores of other driving information layers 1320.

In operation 1302, the electronic device may analyze sensing data. The electronic device may generate various driving information layers 1320 based on a result of analyzing the sensing data. The driving information layer may be a layer including information used to establish a driving plan and may be, for example, a grid map layer. The active sensing position layer 1310 may be a type of the driving information layer. The driving information layer may include a grid map for a geographic region in a range (e.g., a driving-related range) based on a position of the moving object at a reference time point (e.g., the current time point). In some examples, each position (e.g., each space of the grid map) of the driving information layer may include a driving score.

The driving score may be, for example, a driving reward score or a driving cost score. For example, as the driving reward score increases, the point may help achieve a driving purpose and as the driving reward score decreases, the point may interrupt the driving purpose. Contrary to the driving reward score, the driving cost score may indicate that as the score decreases the point helps driving and as the score increases the point interrupts driving. For reference, the driving-related range may be set based on a criterion that is different from the ROI described with reference to FIGS. 1 to 12 may thus have a different scale, size, and shape. Herein, for ease of description, the description is provided with an example of the driving reward score. However, the example is not limited thereto, and the driving cost score may be used based on design.

For reference, the driving information layer may include, for example, an obstacle layer and a destination layer. However, the example of the driving information layer is not limited thereto. The obstacle layer may be a layer indicating a position of an obstacle detected based on the sensing data. Although described below with reference to FIG. 14, a negative driving reward score may be mapped onto a position corresponding to the obstacle. The destination layer may be a layer indicating a position of an intermediate destination or a travel destination to be reached based on the driving purpose. Although described below with reference to FIG. 14, a positive driving reward score may be mapped onto a position corresponding to a destination.

In operation 1303, the electronic device may determine a driving plan. The electronic device in an example may determine the driving plan based on the active sensing position layer 1310 and other layers (e.g., the driving information layer) for driving. The electronic device may update the driving plan based on driving scores of the driving information layers 1320 and the active sensing position layer 1310.

For example, FIG. 14 illustrates an active sensing position layer 1410, an obstacle layer 1420, and a destination layer 1430. Similar to the example described with reference to FIG. 3, an example of a plan in which a moving object 1401 changes from a driving lane to the left lane. In FIG. 14, the description is provided with an example of a driving reward score. As illustrated, a driving reward score (e.g., a positive point) may be mapped onto a surrounding region based on the active sensing position 1411 in the active sensing position layer 1410. In the obstacle layer 1420, a driving reward score (e.g., a negative point) may be mapped onto a surrounding region based on an obstacle 1421 (e.g., another vehicle). In the destination layer 1430, a driving reward score (e.g., a positive point) may be mapped onto a surrounding region based on a destination 1431. Each driving information layer may be generated with respect to a region that is set based on a predicted position 1402 of the moving object.

The electronic device, such as electronic device 1700, may generate a driving plan layer 1450 based on the layers 1410, 1420, and 1430 described above. For example, the electronic device may sum driving scores for each point of the layers 1410, 1420, and 1430. The electronic device may determine a result obtained by summing the scores of the layers 1410, 1420, and 1430 to be a score for each point of the driving plan layer 1450. The electronic device may calculate a path 1409 in which a score (e.g., a reward) is maximized in the driving plan layer 1450. The electronic device may generate or update the driving plan including the calculated path 1409. However, the example of updating the driving path illustrated in FIG. 14 is only an example.

When the driving plan includes a lane change, the electronic device in an example may move the moving object at a position in the driving lane to add an available sensing region of the sensor before the moving object changes the lane. The electronic device may update the driving plan based on information that is sensed in the added available sensing region. Accordingly, the electronic device may secure the safety of the moving object by collecting the sensing information as much as possible in its driving lane before changing the lane.

Figure 15:
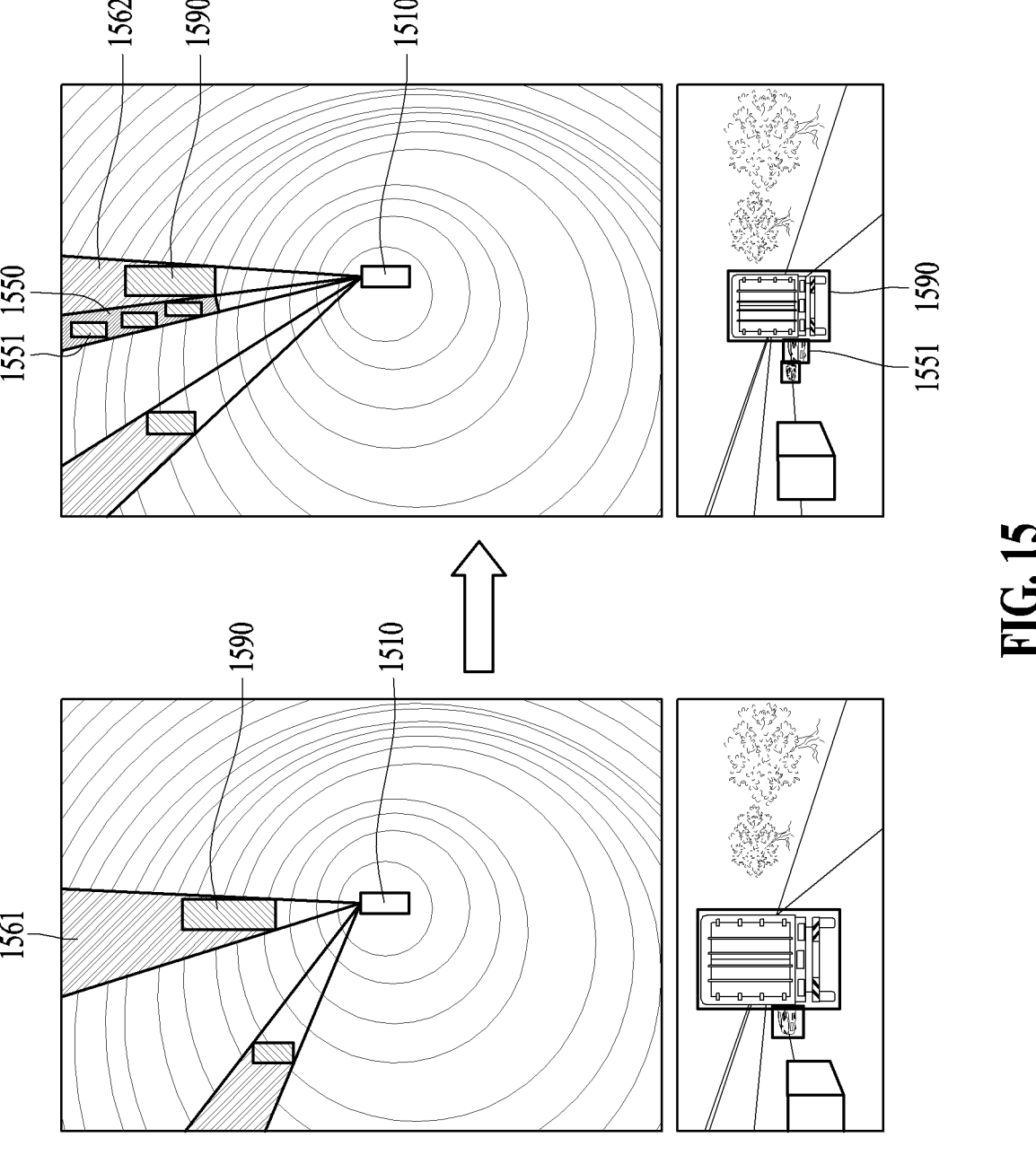
FIGS. 15 and 16 illustrate an example of an additional view secured by a target position offset selected for active sensing.
Figure 16:
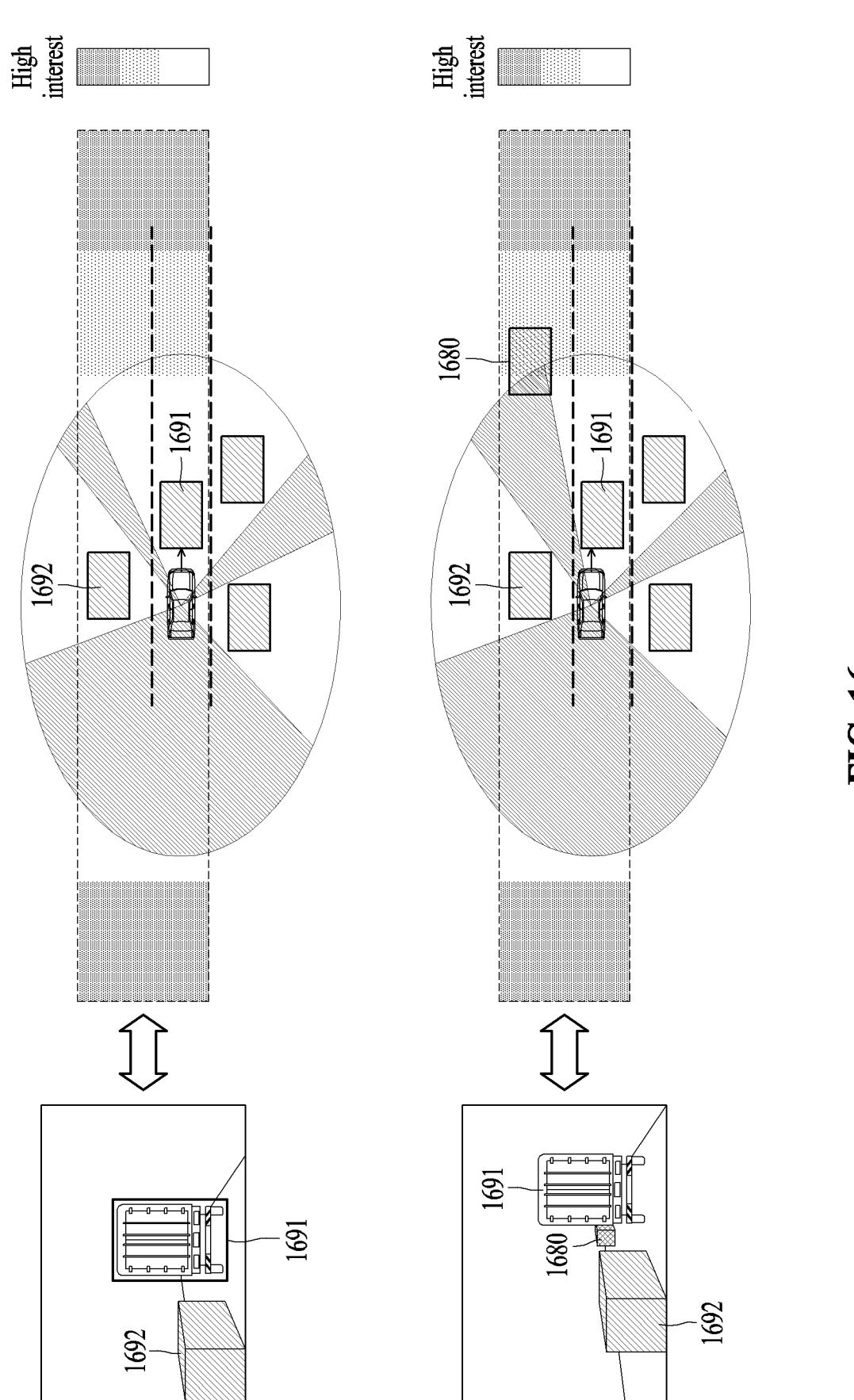

FIGS. 15 and 16 illustrate an example of an additional view secured by a target position offset selected for active sensing.

An electronic device in an example may additionally secure an FOV of a sensor through active sensing. In the example of FIG. 15, a sensor of a moving object 1510 may not be able to collect information for an unavailable sensing region 1561 because of an obstacle object 1590. The electronic device may secure an additional sensing region 1550 by driving with a target position offset in which a distance to the obstacle object 1590 increases. The electronic device may discover additional obstacles 1551 in the additional sensing region 1550. The unavailable sensing region 1562 may decrease. Accordingly, the electronic device may determine whether to change a lane to the next lane by considering information collected in the additional sensing region 1550 in a congestion situation of the driving lane that commonly occurs in an urban environment.

Similarly, in the example of FIG. 16, as the moving object moves by an offset to the left rear side, an available FOV of the sensor may increase. The electronic device may detect a new obstacle 1680 that was invisible due to obstacles 1691 and 1692.

In addition, when there is only one lane in a road, overtaking may be possible through a region where crossing the center line is allowed. When there are many low-speed vehicles, driving on only the center of the lane may be inefficient. The electronic device, in an example, may determine the existence of a vehicle oncoming from a far place on the opposite lane beyond the center line through active sensing for securing an FOV of the sensor described above. Accordingly, the electronic device may accurately determine a risk level by identifying a situation of the opposite lane through sufficiently securing the FOV. The electronic device may efficiently establish an autonomous driving plan including overtaking.

Figure 17:
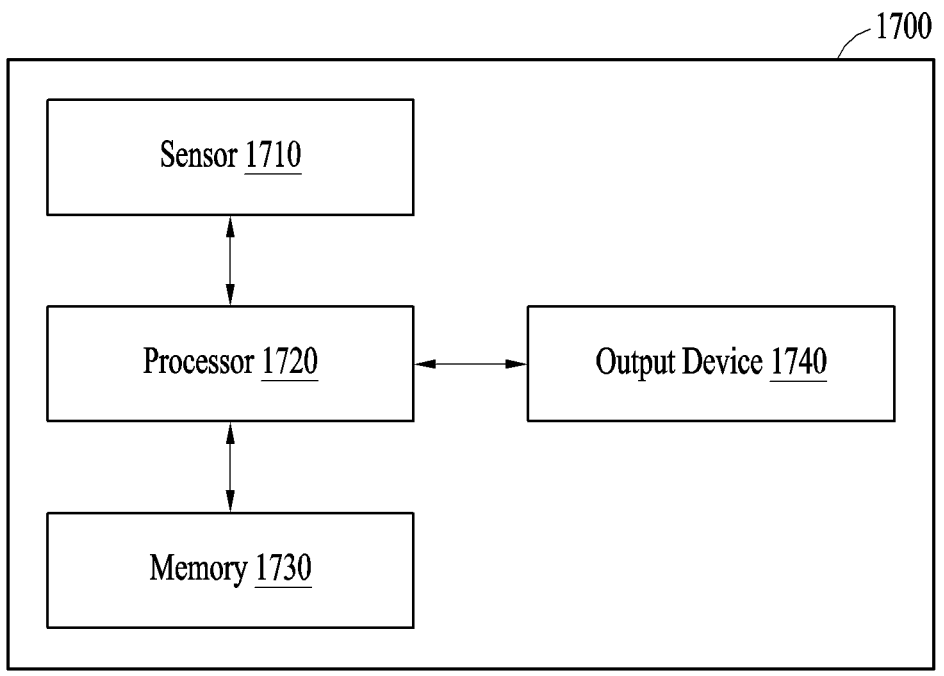
FIGS. 17 and 18 illustrate an example of a configuration of an electronic device.

FIG. 17 illustrates an example of a configuration of an electronic device.

An electronic device 1700 in an example may include a sensor 1710, a processor 1720, a memory 1730, and an output device 1740.

The sensor 1710 may generate sensing data by receiving a signal (e.g., visible rays, a radar signal, light, ultrasonic waves, or infrared rays). For example, the sensor 1710 may include a camera sensor, a radar sensor, a LiDAR sensor, an ultrasonic sensor, or an infrared sensor. The camera sensor may generate image data as sensing data by sensing and receiving light (e.g., light in a visible band) reflected from a physical point (e.g., a point on an obstacle object). The radar sensor may generate radar data by radiating and receiving a radar signal. The LiDAR sensor may generate LiDAR data by radiating and receiving light. The ultrasonic sensor may generate ultrasonic data by radiating and receiving an ultrasonic wave. The infrared sensor may generate infrared data by sensing infrared ray radiated from an object. However, the example is not limited thereto, and the sensor 1710 may collect various pieces of sensing data for driving. For example, the sensor 1710 may include a GNSS module for localization and an inertial measurement unit (IMU) module for motion estimation of a moving object. The electronic device 1700 may determine a current position and a current motion (e.g., a velocity, an acceleration, an angular velocity, and a steering direction) of a moving object based on a GNSS signal and an IMU signal.

The processor 1720 may control at least one other component of the electronic device 100 and perform processing of various pieces of data or computations. The processor 1720 may control an overall operation of the electronic device 1700 and may execute corresponding processor-readable instructions for performing operations of the electronic device 1700. The processor 1720 may execute, for example, software stored in the memory 1720 to control one or more hardware components, such as, sensor 1710 of the electronic device 1700 connected to the processor 1720 and may perform various data processing or operations, and control of such components.

The processor 1720 may determine a predicted position of the moving object and an ROI based on a driving plan of the moving object. The processor 1720 may select a target position offset based on an available sensing region of the sensor 1710 in the ROI determined based on the predicted position. The processor 1720 may determine the driving plan of the moving object based on the selected target position offset. However, the operation of the processor 1720 is not limited thereto, and the processor 1720 may perform at least one of the operations described with reference to FIGS. 1 to 16 in parallel or in a time series.

The processor 1720 may plan a trajectory to drive to secure an FOV of the sensor. For example, the processor 1720 may generate a trajectory passing through an active sensing position or an adjacent position to the active sensing position described above.

The processor 1720 may select the ROI to be a region including a path based on the autonomous driving plan or the full region. Herein, the description is mainly provided with an example in which a region in a predetermined range based on the predicted position of the moving object based on the autonomous driving plan is the ROI. The predicted position of the moving object may be determined to be a position to which the moving object moves along the road alignment of a lane corresponding to the driving plan at a constant velocity from a reference time point (e.g., a current time point) to a predicted time point.

The processor 1720 may be a hardware-implemented data processing device. The hardware-implemented data processing device 1720 may include, for example, a main processor (e.g., a central processing unit (CPU), a field-programmable gate array (FPGA), or an application processor (AP)) or an auxiliary processor (e.g., a GPU, a neural processing unit (NPU), an image signal processor (ISP), a sensor hub processor, or a communication processor (CP)) that is operable independently of, or in conjunction with the main processor. Further details regarding the processor 1720 are provided below.

The memory 1730 may store information required to determine the active sensing position. For example, the memory 1730 may store the sensing data, the active sensing position, map data, and driving information layers. However, this is only an example, and the information stored in the memory 1730 is not limited thereto. In an example, the memory 1730 may store a program (or an application, or software). The stored program may be a set of syntaxes that are coded and executable by the processor 1720 to operate the electronic device 1700. The memory 1730 may include a volatile memory or a non-volatile memory.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further details regarding the memory 102 are provided below.

In some examples, the processor 1710 may output the driving plan, the predicted position of the moving object and an ROI based on a driving plan of the electronic device 1850 through the output device 1740. In some examples, the processor 1710 may display the selected offset on the output device 1740. In some examples, the output device 1740 may provide an output to a user through auditory, visual, or tactile channel. The output device 1740 may include, for example, a speaker, a display, a touchscreen, a vibration generator, and other devices that may provide the user with the output. The output device 1740 is not limited to the example described above, and any other output device, such as, for example, computer speaker and eye glass display (EGD) that are operatively connected to the electronic device 1740 may be used without departing from the spirit and scope of the illustrative examples described. In an example, the output device 1740 is a physical structure that includes one or more hardware components that provide the ability to render a user interface, output information and speech, and/or receive user input.

Figure 18:
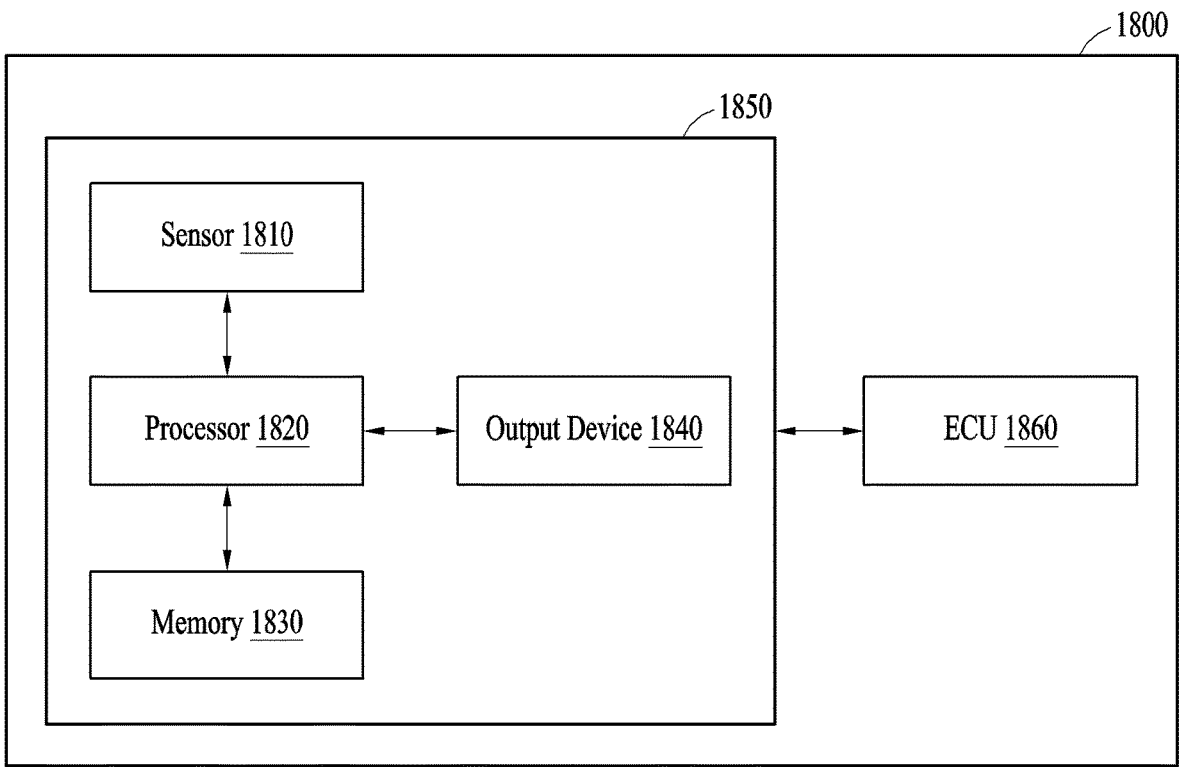

FIG. 18 illustrates an example of a configuration of an electronic device.

As illustrated in FIG. 18, an electronic device 1850 may be mounted on a vehicle 1800 (e.g., an autonomous vehicle). The vehicle 1800 may include the electronic device 1850 and an electronic control unit (ECU) 1860. The electronic device 1850 may include a sensor 1810, a processor 1820, a memory 1830, and an output device 1840. The electronic device 1850 may be an instances of the electronic device 1700 of FIG. 17, the sensor 1810 may be an instance of the sensor 1710 of FIG. 17, the processor 1820 may be an instance of the processor 1720 of FIG. 17 the memory 1830 may be an instance of the memory 1730 of FIG. 17, and the output device 1840 may be an instance of the output device 1740 of FIG. 17. In addition to the description of FIG. 18 below, the description of FIG. 17 is also applicable to FIG. 18 and are incorporated herein.

The moving object may be the vehicle 1800. The processor 1820 may control at least one of a velocity, an acceleration, and steering of the vehicle 1800 based on the updated driving plan. For example, the processor 1820 may be electrically connected to the ECU 1860. The processor 1820 may control the ECU 1860.

The ECU 1860 may control operations of the vehicle 1800. For example, in response to a command of the processor 1720, the ECU 1860 may change and/or adjust at least one of the velocity, acceleration, and steering of the vehicle 1800. The ECU 1860 may control an electric motor or a throttle (e.g., a fuel valve) for fuel injection to an engine by driving an electric motor to reach a desired velocity or acceleration. In addition, the ECU 1860 may slow down the vehicle 1800 by operating a brake or by engine braking. The ECU 1860 may control a steering angle.

The electronic device 1850 in an example may secure safety of the vehicle 1800, may improve the recognition performance of the sensor, and may establish an effective autonomous driving plan through a secured FOV of the sensor based on the active sensing described above.

The computing apparatuses, the electronic devices, the processors, the memories, and other components described herein with respect to FIGS. 1-18 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in the figures that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the meth- ods as described above may be written as computer pro- grams, code segments, instructions or any combination thereof, for individually or collectively instructing or con- figuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hard- ware, for example, one or more processors or computers, to implement the hardware components and perform the meth- ods as described above, and any associated data, data files, and data structures, may be recorded, stored, or fixed in or on one or more non-transitory computer-readable storage media. Examples of a non-transitory computer-readable storage medium include read-only memory (ROM), ran- dom-access programmable read only memory (PROM), electrically erasable programmable read-only memory (EE- PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD- Rs, DVD+Rs, DVD-RWs, DVD+RWs, DVD-RAMs, BD- ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An electronic system of a vehicle, the electronic system comprising:
   a sensor configured to generate sensing data;
   one or more processors; and
   a memory comprising one or more non-transitory storage media that store instructions that, when executed by the one or more processors, configures the one or more processors to:
      while the vehicle is driving along a first trajectory generated by a driving plan, determine a predicted future position of the vehicle and a region of interest (ROI), corresponding to the predicted future posi- tion, respectively based on the driving plan of the vehicle;
      select a target position offset based on a determined available sensing region of the sensor in the ROI and the predicted future position, where the target posi- tion offset is selected to provide an increased, com- pared to the determined available sensing region, available sensing region of the sensor; and
      update, based on the target position offset, the driving plan of the vehicle to generate a second trajectory for the vehicle to drive along towards a position corre- sponding to the target position offset.

2. The electronic system of claim 1, wherein the execution of the instructions further configures the one or more pro- cessors to perform the prediction of the future position of the vehicle at a future prediction time point that is based on a path of the vehicle, a velocity of the vehicle, and the driving plan of the vehicle.

3. The electronic system of claim 1, wherein the execution of the instructions further configures the one or more pro- cessors to determine the ROI based on at least one of a driving lane of the vehicle or a future scheduled driving lane of the vehicle based on the driving plan.

4. The electronic system of claim 1, wherein the execution of the instructions further configures the one or more pro- cessors to determine the ROI based on an alignment of a road and a width of a lane corresponding to the driving plan.

5. The electronic system of claim 1, wherein the execution of the instructions further configures the one or more pro- cessors to determine the ROI including a point correspond- ing to a height of an object spaced apart from the ground, in response to the vehicle approaching the object, wherein the object is configured to provide traffic information.

6. The electronic system of claim 1, wherein the deter- mined available sensing region of the sensor is a region that is not occluded by an obstacle in an overlapping region of the ROI and a sensing range of the sensor.

7. The electronic system of claim 1, wherein the execution of the instructions further configures the one or more pro- cessors to select the target position offset in an adjustable driving range based on the predicted future position of the vehicle.

8. The electronic system of claim 7, wherein the execution of the instructions further configures the one or more processors to determine the adjustable driving range based on a driving lane of the vehicle.

9. The electronic system of claim 7, wherein the adjustable driving range corresponds to a range that limits escape of the vehicle from the driving lane.

10. The electronic system of claim 7, wherein the execution of the instructions further configures the one or more processors to select the target position offset based on a sensor range evaluation of a plurality of position offsets in the adjustable driving range.

11. The electronic system of claim 7, wherein a plurality of position offsets in the adjustable driving range comprises an offset spaced apart from the sensor in a front direction of the vehicle, an offset spaced apart from the sensor in a rear direction of the vehicle, an offset spaced apart from the sensor in a first side direction of the vehicle, and an offset spaced apart from the sensor in a second side direction of the vehicle that is opposite to the first side direction, wherein the execution of the instructions further configures the one or more processors to select the target position offset from the plurality of position offsets based on the predicted future position of the vehicle.

12. The electronic system of claim 7, wherein the ROI comprises a plurality of points comprising a first point closer to the sensor and a second point farther from the sensor, and wherein the execution of the instructions further configures the one or more processors to:

assign scores to the plurality of points, the assigned scores for the first point and the second point being different;

calculate an evaluation score for each of the plurality of position offsets based on the scores assigned to the plurality of points; and select the target position offset from the plurality of position offsets based on the evaluation score.

13. The electronic system of claim 1, wherein the execution of the instructions further configures the one or more processors to initiate a search for a position offset that provides the increased available sensing region of the sensor, in response to a ratio of an unavailable sensing region to a full sensing region of the sensor exceeding a threshold.

14. The electronic system of claim 13, wherein the execution of the instructions further configures the one or more processors to maintain the updated driving plan, in response to the ratio being lesser than or equal to the threshold.

15. The electronic system of claim 1, wherein the execution of the instructions further configures the one or more processors to control at least one of a velocity, an acceleration, and steering of the vehicle based on the updated driving plan.

16. The electronic system of claim 15, wherein the execution of the instructions further configures the one or more processors to:

move the vehicle at a position in a driving lane according to the target position offset before the vehicle changes a lane, in response to the driving plan comprising a lane change; and perform the update of the driving plan based on information sensed in the increased available sensing region.

17. The electronic system of claim 1, wherein the driving plan comprises a path heading to at least one of a travel destination or an intermediate destination based on a driving maneuver.

18. An electronic device comprising:

a sensor disposed in a moving object and configured to generate sensing data;

one or more processors; and a memory comprising one or more non-transitory storage media that store instructions that, when executed by the one or more processors, causes the one or more processors to:

while the vehicle is driving along a first trajectory generated by a driving plan, determine a predicted future position of the moving object and a region of interest (ROI), corresponding to the predicted future position, based on the driving plan of the moving object;

select a target position offset based on a determined available sensing region of the sensor in the ROI and the predicted future position, where the target position offset is selected to provide an increased, compared to the determined available sensing region, available sensing region of the sensor; and update, based on the target position offset, the driving plan of the moving object to generate a second trajectory for the moving object to move along towards a position corresponding the target position, the updating including a generation of an active sensing layer indicating the position corresponding to the target position offset, and a performance of the update of the driving plan based on the active sensing layer and other layers for driving.

19. A method implemented by one or more processors, the method comprising:

while the vehicle is driving along a first trajectory generated by a driving plan, determining a predicted future position of a vehicle and a region of interest (ROI), corresponding to the predicted future position, respectively based on the driving plan of the vehicle;

selecting a target position offset based on a determined available sensing region of a sensor in the ROI and the predicted future position, where the target position offset is selected to provide an increased, compared to the determined available sensing region, available sensing region of the sensor; and updating, based on the target position offset, the driving plan of the vehicle to generate a second trajectory for the vehicle to drive along towards a position corresponding to the target position offset.

20. The method of claim 19, wherein selecting of the target position offset includes a searching for a position offset that provides the increased available sensing region of the sensor, and initiating the searching in response to a ratio of an unavailable sensing region to a full sensing region of the sensor exceeding a threshold.

21. The method of claim 20, wherein the selecting of the target position offset further includes maintaining the driving plan, in response to the ratio being lesser than or equal to the threshold.

22. A method implemented by one or more processors, the method comprising:

while the vehicle is driving along a first trajectory generated by a driving plan, determining a predicted future position of a moving object and a region of interest (ROI), corresponding to the predicted future position, based on the driving plan of the moving object;

selecting a target position offset based on a determined available sensing region of a sensor in the ROI and the predicted future position, where the target position offset is selected to provide an increased, compared to the determined available sensing region, available sensing region of the sensor; and updating, based on the target position offset, the driving plan of the moving object to generate a second trajectory for the moving object to move along towards a position corresponding to the target position offset, wherein the target position offset comprises any one of a first offset distance from the sensor in a front of the moving object, a second offset distance from the sensor in a rear of the moving object, a third offset distance from the sensor in a first side of the moving object, or a fourth offset distance from the sensor in a second side of the moving object.

\* \* \* \* \*